United States Patent
Richardson et al.

(10) Patent No.: US 12,172,476 B1
(45) Date of Patent: Dec. 24, 2024

(54) COUPLER WITH MAGNETIC ELEMENT FOR TOWING UTILITY CARTS

(71) Applicant: Amazon Technologies, Inc., Seattle, WA (US)

(72) Inventors: Morris Lee Richardson, Grand Rapids, MI (US); Raashid Mohammed, Lynnwood, WA (US); Dean Christopher Fullerton, Fall City, WA (US)

(73) Assignee: Amazon Technologies, Inc., Seattle, WA (US)

( * ) Notice: Subject to any disclaimer, the term of this patent is extended or adjusted under 35 U.S.C. 154(b) by 567 days.

(21) Appl. No.: 17/546,613

(22) Filed: Dec. 9, 2021

(51) Int. Cl.
*B60D 1/01* (2006.01)
*B60D 1/36* (2006.01)

(52) U.S. Cl.
CPC . *B60D 1/01* (2013.01); *B60D 1/36* (2013.01)

(58) Field of Classification Search
None
See application file for complete search history.

(56) References Cited

U.S. PATENT DOCUMENTS

| 5,506,489 A * | 4/1996 | Abbott | H02J 50/70 |
| | | | 320/108 |
| 9,914,495 B2 * | 3/2018 | Han | B62D 47/006 |
| 10,654,326 B2 * | 5/2020 | Tozer | B60D 1/46 |

FOREIGN PATENT DOCUMENTS

| CN | 113968109 A * | 1/2022 | B60D 1/01 |
| JP | 10322921 A * | 12/1998 | B60L 11/182 |
| KR | 101688937 B1 * | 12/2016 | |

* cited by examiner

*Primary Examiner* — Kevin Hurley
(74) *Attorney, Agent, or Firm* — Lee & Hayes, P.C.

(57) ABSTRACT

A coupler has a housing including a first end configured to couple to an autonomous guided vehicle (AGV) and a second end having a receptacle. A cabinet operably couples to the housing and is at least partially disposed within the receptacle. A magnetic element is disposed at least partially within the cabinet. The magnetic element is configured to magnetically engage with a portion of a towable cart for transport by the AGV.

20 Claims, 16 Drawing Sheets

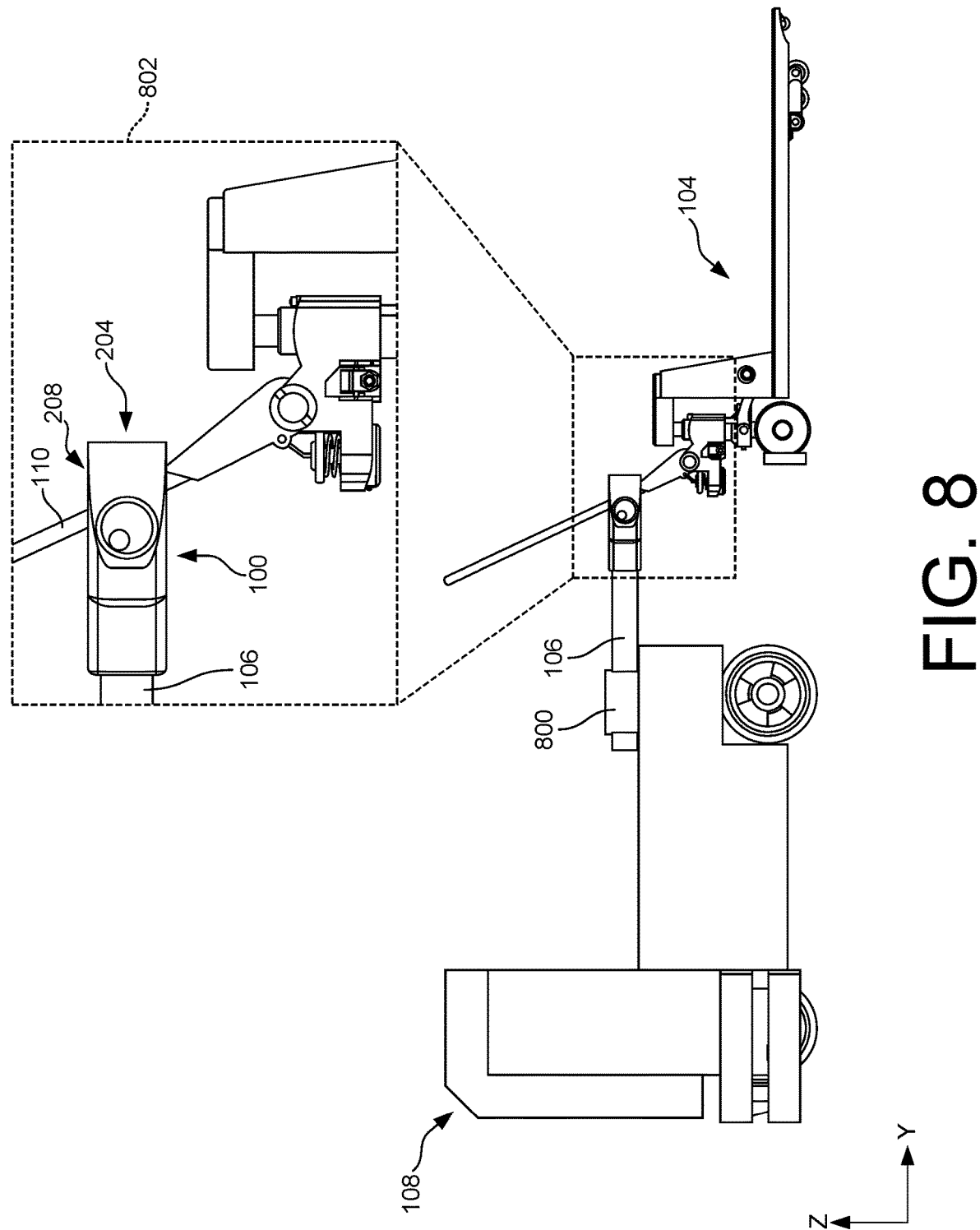

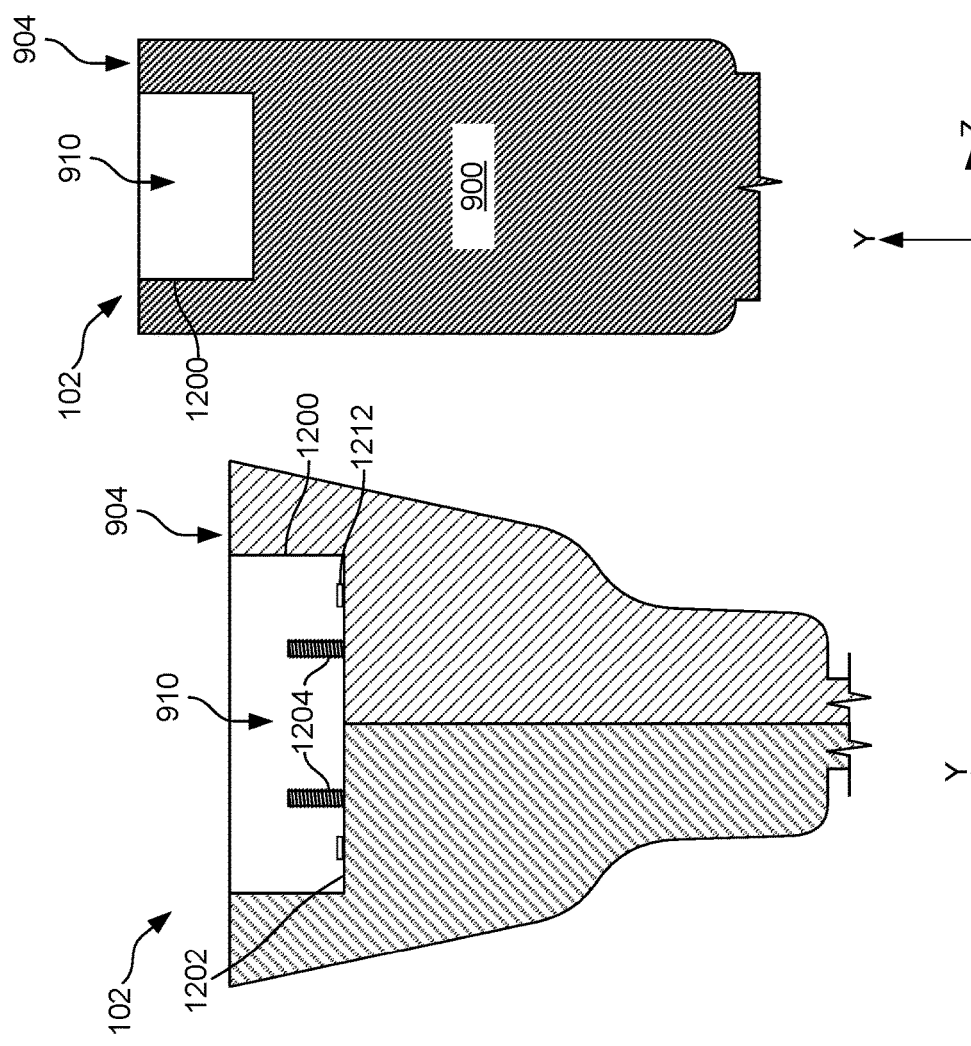

COUPLER WITH MAGNETIC ELEMENT FOR TOWING UTILITY CARTS

BACKGROUND

Trolleys, pallet jacks, or other utility-type carts are used to transport goods from one location to another. For example, within an environment, workers may load the goods onto the utility-type carts for moving the goods from one location to another. In some instances, however, workers may become injured as a result of transporting heavy loads. Additionally, the workers may be at risk of the goods falling. In an effort to alleviate these drawbacks, robots or other machines may be used in addition to or alternative from the workers. However, challenges exist in connecting to the utility carts. As a result, the carts may fail to be properly secured to the machines or goods located thereon may be unstable during transport.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIG. 8 illustrates a robotic device, such as an autonomous guided vehicle, attached to the first coupler of FIG. 1A for coupling to the pallet jack, according to an example of the present disclosure.

FIG. 12A illustrates a first cross-sectional view of the second coupler of FIG. 1B, taken along line A-A of FIG. 10A, according to an example of the present disclosure.

FIG. 12B illustrates a second cross-sectional view of the second coupler of FIG. 1B, taken along line B-B of FIG. 10B, according to an example of the present disclosure.

FIG. 12C illustrates a third cross-sectional view of the second coupler of FIG. 1, taken along line B-B of FIG. 10B, according to an example of the present disclosure.

DETAILED DESCRIPTION

Figure 1A:
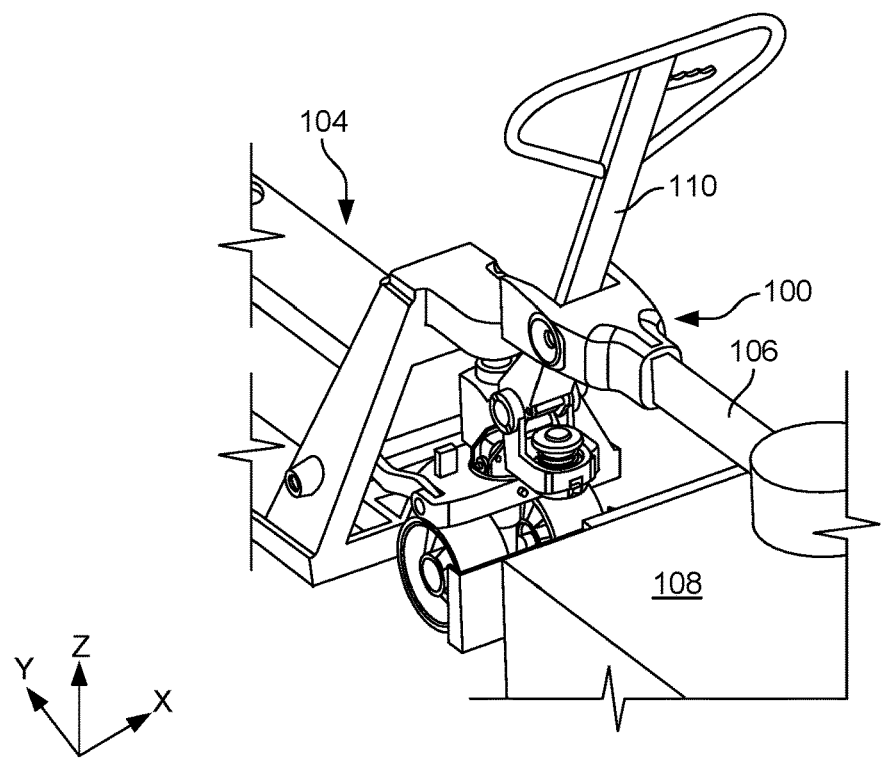
FIG. 1A illustrates an example first coupler for coupling to a cart, such as a pallet jack, according to an example of the present disclosure.

This disclosure is directed, at least in part, to a coupler that is configured to couple an autonomous guided vehicle (AGV) to a cart, such as a pallet jack, flat cart, utility cart, or other towable carriage, wagon, and the like. In some instances, the coupler includes a housing having a first end that couples to the AGV, such as a bar extending from the AGV, and a second end configured to couple or receive a portion of the cart. The second end may represent a hitch, link, or other tow-type mechanism for coupling to the cart. For example, in some instances, the second end may include a magnetic element that couples to a handle, bar, frame, bracket, or other member of the cart. In such instances, portion(s) of the cart may be magnetic (e.g., ferrous) to couple with the magnetic element of the coupler. In some instances, the magnetic element may be an electromagnet that is powered on and off to produce a magnetic field. When powered on, the magnetic element may engage with the portion of the cart, and when powered off, the magnetic element may disengage with the portion of the cart. As such, using the coupler, the AGV may guide (e.g., push and/or push) the cart to various areas within a sortation facility, cross-docketing station, induction center, store, or other environments in which packages, goods, or other items are sorted for delivery, shipment, or processing.

The coupler includes the housing that defines a structure of the coupler. The housing, such as the first end, includes a socket that receives the bar of the AGV. For example, the bar may extend from the AGV and the coupler may be disposed over an end of the bar. The bar may be pivotably and/or rotationally coupled to the AGV such that the bar (and therefore the coupler) may rotate during transport of the cart. For example, as the AGV traverses about the environment, the bar may rotate to tow the cart. Such rotation maintains a connection between the magnetic element and the cart. For example, the rotatable nature of the bar permits a face of the magnetic element to remain substantially planar with the engaged portion of the cart. This substantially planar relationship maintains an attraction between the magnetic element and the engaged portion of the cart.

In some instances, the socket of the housing may include connectors for providing power to the electromagnet. For example, power maybe routed from the AGV to the electromagnet via connectors within the socket (e.g., electrical pin connectors, pads, wires, etc.). Wires, or other cables, may be routed from the connectors to the electromagnet within the housing. Additionally, in some instances, the housing may include sensor(s) that detect a proximity of the coupler, or the second end of the coupler, to the cart. Based on the proximity to the cart, the electromagnet may be powered on and off, respectively. Here, and in such instances, the connectors may further route signals generated by the sensor(s). The AGV, for example, may receive the signals and process the signals for powering on and powering off the electromagnet based on a proximity of the coupler to the cart. However, rather than power and/or the signals being routed within or through connectors internal to the socket, in some instances, wires or other cables may be routed external to the housing for communicatively coupling with the AGV.

In some instances, the magnetic element may have a pulling weight of at least one hundred pounds. However, the size of the magnetic element or an amount of power (current) delivered to the electromagnet may be variable to adjust the pulling weight. In some instances, for example, the magnetic element may have a pulling weight in excess of two thousand pounds. However, although discussed herein as pulling carts, in some instances, the magnetic element (or more generally the coupler) may be used to engage the carts such that the AGV may push the carts. Additionally, the magnetic elements may be used to pick up objects, items, or other goods for picking and placing operations. The magnetic element may be composed of a single magnetic element or may be made up of multiple magnetic elements.

The sensor(s) may additionally or alternatively include gaussmeters, magnetometers, or other sensor(s) that measure an electromagnetic field (EMF) emitted by the electromagnet. In some instances, the sensor(s) may measure or detect a strength of the EMF as well as disturbances in the EMF. If a disturbance of the EMF is sensed (e.g., above a threshold amount of change) or a strength of the EMF is altered (e.g., below a threshold strength), the electromagnet may be powered off and/or movement of the AGV may be halted. In such instances, the sensor(s) may be used to detect an ongoing strength of the EMF as well as variances in the EMF. Fluctuations in the strength and/or the disturbance, relative to a predetermined threshold, may be used to power off and/or halt movement of the AGV. For example, to prevent injury to workers or other people within the environment, the AGV may halt movement and/or the electromagnet may be powered off. The disturbance, for example, may be indicative of a hand of a person being placed adjacent to the coupler and to reduce injury, the electromagnet may be powered off and/or movement of the AGV may be halted. Along these lines, in some instances, the sensor(s) may also detect whether persons (or other objects) are within a proximity of the coupler and whether it is safe to couple with the cart. For example, computer vision techniques may analyze image(s) as captured by camera(s) for determining whether persons or objects are within a certain range of the AGV, the couplers, or whether it is safe to engage with the carts.

In some instances, the magnetic element is disposed within a cavity or receptacle at the second end and is depressible within the cavity. For example, biasing member(s) (e.g., spring(s), gas cylinder, etc.) may be disposed within the receptacle and engage the magnetic element. As the magnetic element comes into contact with the cart, the biasing members may compress. The compression may be sensed (e.g., via the sensor(s)), and in response, the magnetic element may be powered. However, the biasing member(s) may additionally or alternatively be disposed within the socket at the first end. Regardless of the position of the biasing members, the biasing members and the sensor(s) serve to indicate when the coupler contacts, abuts, or touches the cart. For example, the biasing members may provide a positive feedback that the coupler abuts or is contacting the cart. Therein, the electromagnet may be powered to engage with the cart. In some instances, the use of the biasing members and the sensor(s) serves to limit the magnetic element attracting other objects (e.g., other carts, benches, etc.) within the environment when not coupled to the cart or transporting the cart.

In some instances, the second end may include arms that engage with the cart. The cart may assist in guiding the portion of the cart into engagement with the magnetic element and/or engage portions of the cart. Additionally, or alternatively, in some instances, the magnetic element is rotatably mounted within the housing between the arms. For example, in some instances the arms are configured to engage a handle of a pallet jack. The magnetic element may be rotatable within the housing such that when the AGV couples to the pallet jack and pulls the pallet jack, the magnetic element is capable of rotating as the handle changes angle. For example, during a pulling of the pallet jack, the handle may rotate in a direction towards a ground surface. The rotatable nature of the magnetic element allows the magnetic element to rotate with the rotation of the handle to maintain engagement with the handle. In such instances, the coupler and the bar may remain stationary as the magnetic element is permitted to rotate within the housing. However, the bar and the coupler may still rotate as the AGV traverses about the environment (e.g., around bends, curves, etc.).

The AGV may communicatively couple to one or more remote system(s) for receiving and transmitting information. For example, the remote system(s) may communicate with the AGV as to a particular cart to transport within an environment. Such information may be used by the AGV to travel to a first location for coupling to the cart (e.g., pickup location) and then traveling to the second location for decoupling from the cart (e.g., drop off location). To travel within the environment, the AGV may include various sensor(s). The sensor(s), for example, may include imaging sensor(s) (e.g., camera(s), LIDAR, RADAR, etc.) that image an environment of the AGV for knowing where to travel. Additionally or alternatively, the imaging sensor(s) may image fiducials placed about the environment (e.g., on the ground surface, within traveling lanes, etc.). The imaging sensor(s) may further be included to align the coupler (or the bar) on a particular portion of the cart (e.g., handle, foot guard, frame, etc.).

In some instances, components of the coupler may be replaceable and/or interchangeable. For example, as the magnetic element becomes worn, the magnetic element may be replaced. Moreover, in some instances, the AGV may be equipped with one or more couplers respectively coupled to the bar or multiple bars. The multiple couplers may be used for respectively coupling to a cart and depending on the cart being towed. For example, a first coupler may be used to tow a first type of cart (e.g., utility cart), and a second coupler may be used to tow a second type of cart (e.g., pallet jack). Here, the AGV may select (or be instructed) as to the type of coupler to use when towing the carts, respectively.

The coupler therefore enables the AGV to conveniently couple to various types of carts for transporting the carts within various environments. The coupler couples to the cart, for example, using magnetic elements that attract to or otherwise engage with surfaces (e.g., handles, bars, frames, etc.) of the cart. Additionally, the coupler is received by a bar pivotably coupled to the AGV. The use of the coupler may increase a throughput within the environment by allowing the AGVs to process and transport a greater number of carts. Furthermore, the coupler may reduce human errors and/or increase a safety within the environment.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting examples. The features illustrated or described in connection with one example may be combined with the features of other examples. Such modifications and variations are intended to be included within the scope of the appended claims.

Figure 1B:
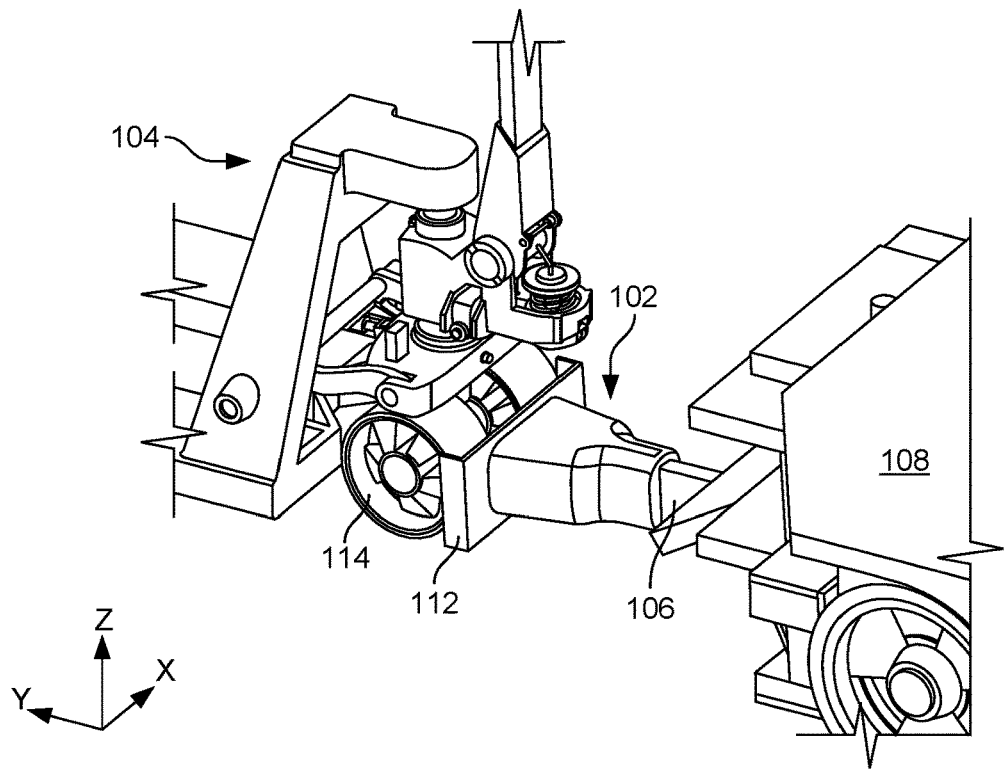
FIG. 1B illustrates an example second coupler for coupling to a cart, such as a pallet jack, according to an example of the present disclosure.

FIGS. 1A and 1B respectively illustrate an example first coupler 100 and an example second coupler 102 coupled to a pallet jack 104. The first coupler 100 and the second coupler 102 are discussed in turn in FIGS. 1A and 1B, as well as FIGS. 2-8 and 9-16, respectively.

In FIG. 1A, the first coupler 100 is shown coupled to a bar 106 that extends from an autonomous guided vehicle (AGV) 108. For example, the bar 106 may rotationally couple to the AGV 108 and extend from the AGV 108. In some instances, the bar 106 is extendable from the AGV 108 by different lengths (e.g., in the Y-direction). The first coupler 100 couples to the bar 106 for engaging with a portion of the pallet jack 104, such as a handle 110 of the pallet jack 104. In some instances, as the AGV 108 approaches the pallet jack 104, the bar 106 may extend such that the first coupler 100 engages with the handle 110. In other instances, the bar 106 may remain at a fixed extension from the AGV 108. As shown, the bar 106 extends from the AGV 108 at a location (e.g., height) appropriate for engaging with the handle 110.

As discussed herein, the first coupler 100 includes a housing for receiving the handle 110 and coupling to the handle 110. For example, a magnetic element of the first coupler 100 may attract to the handle 110. In such instances, the handle 110 may include iron-based metals such that the magnetic element is capable of engaging the handle 110. Additionally, the magnetic element may include an electromagnet that is configured to be selectively powered on and powered off for engaging and disengaging the handle 110. Such power may be supplied by the AGV 108. As additionally discussed herein, the magnetic element may be rotatable within the housing such that as the handle 110 rotates (e.g., about the X-axis) the magnetic element correspondingly rotates to maintain an engagement with the handle 110. Furthermore, the bar 106 rotationally couples to the AGV 108 (e.g., about the Z-axis), such that bar 106 (and therefore the first coupler 100), are capable of rotating as the AGV 108 traverses about an environment (e.g., about the Z-axis).

In FIG. 1B, the second coupler 102 is shown coupled to the bar 106 that extends from the AGV 108. The bar 106 may rotationally couple to the AGV 108 and extend from the AGV 108 by different lengths (e.g., in the Y-direction). The second coupler 102 couples to the bar 106 for engaging with a portion of the pallet jack 104, such as a foot guard 112 of the pallet jack 104. As shown, the foot guard 112 presents a plate positioned adjacent to one or more wheel(s) 114 of the pallet jack 104, proximate a ground surface on which the wheel(s) 114 engage. In some instances, as the AGV 108 approaches the pallet jack 104, the bar 106 may extend such that the second coupler 102 engages with the foot guard 112. In other instances, the bar 106 may remain at a fixed extension from the AGV 108. As shown, the bar 106 extends from the AGV 108 at a location (e.g., height) appropriate for engaging with the foot guard 112.

As discussed herein, the second coupler 102 includes a housing for coupling to the handle 110. For example, a magnetic element of the second coupler 102 may attract to the foot guard 112. In such instances, the foot guard 112 may include iron-based metals such that the magnetic element is capable of engaging the foot guard 112. Additionally, the magnetic element may include an electromagnet that is configured to be selectively powered on and powered off for engaging and disengaging the foot guard 112. Such power may be supplied by the AGV 108. The bar 106 rotationally couples to the AGV 108 (e.g., about the Z-axis), such that bar 106 (and therefore the second coupler 102), are capable of rotating as the AGV 108 traverses about an environment (e.g., about the Z-axis).

In some instances, the AGV 108 may be equipped with the first coupler 100 and the second coupler 102. In such instances, the first coupler 100 and the second coupler 102 may be disposed on respective bars that extend from the AGV 108. The AGV 108 may determine whether to use the first coupler 100 and/or the second coupler 102 for coupling to the pallet jack 104, for example, based on characteristic(s) of the pallet jack 104 (e.g., size, weight, etc.), image analysis that detects the type of cart, and/or characteristic(s) of other carts capable of being towed by the AGV 108.

Although FIGS. 1A and 1B illustrate the first coupler 100 and the second coupler 102 coupling to the pallet jack 104, the first coupler 100 and the second coupler 102 may couple to other carts, wagons, carriages, trolleys, or other towable transport items. In such instances, the first coupler 100 and the second coupler 102 may represent a universal coupler that engages with handles, frames, brackets, bars, and the like. In some instances, the first coupler 100 and the second coupler 102 may find use in various environments for use in transporting goods, items, or other objects from one location to another. For example, within the environments, the AGVs may be used to transport goods between locations for storage, shipment, sortation, or other processing. Such goods may include commodities (e.g., food, goods, etc.), packages (e.g., envelopes, boxes, etc.), containers (e.g., gaylords, pallets, crates, etc.), and so forth.

The first coupler 100 and the second coupler 102 may additionally or alternatively include other mechanisms for engaging with the pallet jack 104. These other mechanisms may further assist is securing the first coupler 100 and the second coupler 102 to portions of the pallet jack 104. For example, the first coupler 100 may include tabs, hooks, or catches that engage with the handle 110. In some instances, the catches may actuate to engage with sides, or a rear surface of the handle 110 (opposite where the magnetic element engages). The catches, for example, may prevent release of the handle and separation from the first coupler 100.

The first coupler 100 and the second coupler 102 are shown including rigid-type mechanisms for engaging with the pallet jack 104. However, in some instances, the first coupler 100 or the second coupler 102 may include shape-shifting materials that engage with portions of the pallet jack 104. For example, a ferrous gel may be encased (e.g., wrapped in) with a latex material. As power (current) is applied to the ferrous gel, the ferrous gel may deform in such a way to engage the pallet jack 104 (e.g., wrap around the handle 110). In such instances, the ferrous gel may be used to mold around objects for gripping and then subsequently, pulled by the AGV 108 during transport.

Figure 2A:
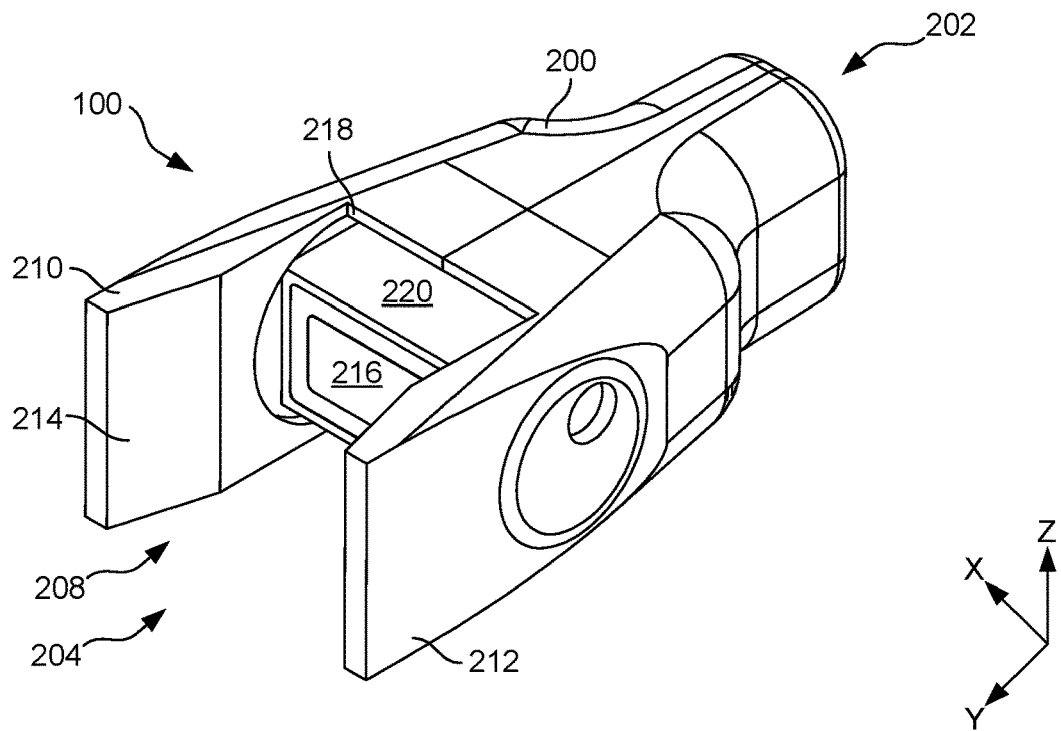
FIG. 2A illustrates a first perspective view of the first coupler of FIG. 1A, according to an example of the present disclosure.
Figure 2B:
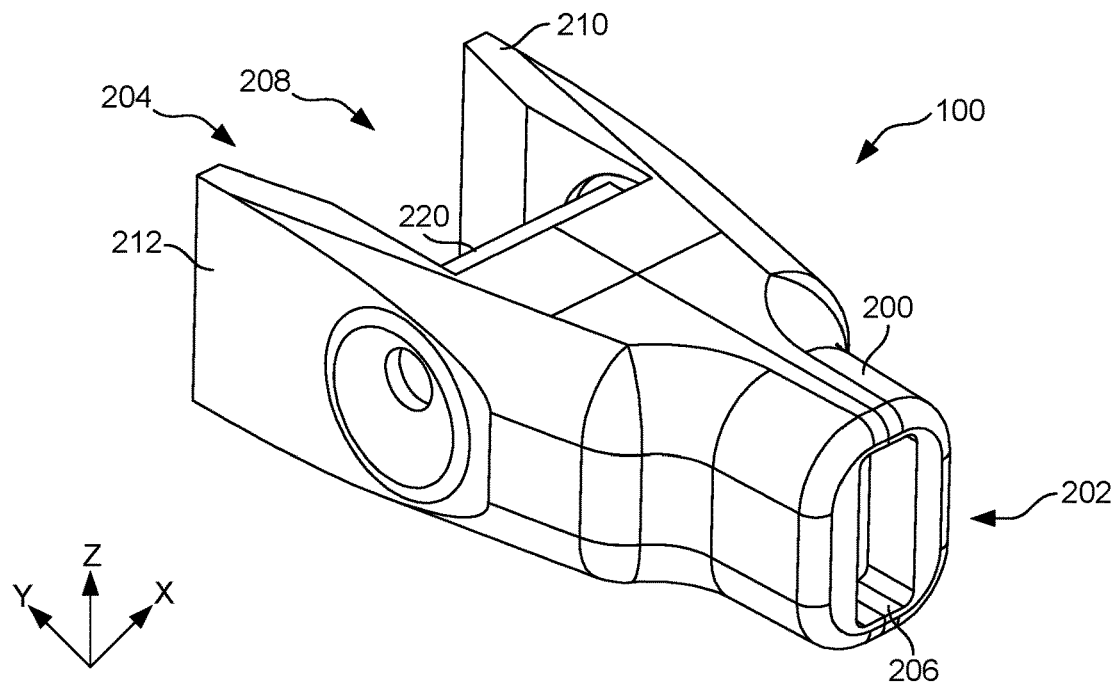
FIG. 2B illustrates a second perspective view of the first coupler of FIG. 1A, according to an example of the present disclosure.

FIGS. 2A and 2B illustrate perspective views of the first coupler 100. In some instances, FIG. 2A illustrates a front perspective view of the first coupler 100 and FIG. 2B illustrates a rear perspective view of the first coupler 100.

The first coupler 100 is shown including a housing 200 having a first end 202 and a second end 204. The first end 202 is configured to couple to the bar 106 of the AGV 108. For example, in some instances, the first end 202 includes a socket 206 within which the bar 106 engages. The bar 106 may removably couple to first coupler 100, within the socket 206, via fasteners, for example. In other instances, the bar 106 may be a component of the first coupler 100 and permanently couple to the first coupler 100. In such instances, the bar 106 and the first coupler 100 may couple to the AGV 108 as a single unit. In other instances, the bar 106 may slidably engage with the first coupler 100. The socket 206 includes a corresponding shape that is complimentary with the bar 106. Additionally, the socket 206 may include a depth (e.g., Y-direction) into which an end of the bar 106 is placed.

The second end 204 includes a receptacle 208 for receiving the handle 110 of the pallet jack 104. When engaged with the handle 110, the handle 110 may be received or reside within the receptacle 208. In some instances, the receptacle 208 is defined at least in part by a first arm 210 and a second arm 212. The first arm 210 and the second arm 212 may represent a portion of the housing 200 and are shown extending in a direction along a length of the first coupler 100, from the first end 202 to the second end 204 (Y-direction). The receptacle 208 may include a sidewall 214 that is formed at least in part by the housing 200, or by the first arm 210 and the second arm 212. The first arm 210 and the second arm 212 are spaced apart (X-direction) by an amount to engage the handle 110 of the pallet jack 104.

A magnetic element 216 is shown residing at least partially within the receptacle 208, between the first arm 210 and the second arm 212, as well as a base 218 of the receptacle 208. In some instances, the magnetic element 216 resides within (or is disposed within) a cabinet 220. The cabinet 220 may prevent damage to the magnetic element 216, provide structural support to the magnetic element 216, and/or couple the magnetic element 216 to the housing 200. For example, the cabinet 220 may be rotatably coupled to the housing 200 within the receptacle 208.

The magnetic element 216 and the cabinet 220 are configured to rotate (e.g., about the X-axis) to maintain contact with the handle 110. In other words, during transport of the pallet jack 104, pulling on the handle 110 may cause the handle 110 to rotate in a direction towards a ground surface. During such occurrence, the rotatable nature of the magnetic element 216 permits the magnetic element 216 to maintain contact with the handle 110 as the handle 110 rotates. As such, the first coupler 100 may maintain an engagement with the handle 110. Comparatively, when the pallet jack 104 comes to a rest, and the handle 110 rotates in an opposite direction given a biasing nature of the handle 110. Here, the magnetic element 216 may correspondingly rotate with the handle 110.

In some instances, the magnetic element 216 represents an electromagnet that is configured to be powered on and off. Power may be delivered to the magnetic element 216 via the AGV 108. The electromagnet may be a direct current (DC) magnet to a DC voltage source onboard the AGV 108. For example, one or more wires, cables, etc. may route power from the AGV 108 to the magnetic element 216. The AGV 108 may selectively supply and restrict power to the magnetic element 216 to couple and decouple from the handle 110, respectively. That is, to couple to the handle 110, power may be supplied to the magnetic element 216, and to decouple from the handle 110 (e.g., upon arriving at a drop off location), power may be restricted to the magnetic element 216. In some instances, the cables that route power may be routed within the socket 206 and the bar 106, as well as through the housing 200 to the magnetic element 216. Additionally, or alternatively, the cables may route from the AGV 108 to the first coupler 100, external to the housing 200 and/or the bar 106.

In some instances, the housing 200 may be manufactured from a plurality of materials including plastic (e.g., polyethylene terephthalate (PET), polycarbonate (PC), polypropylene (PP), etc.), composites (e.g., carbon fiber), nonferrous metals (e.g., aluminum, nickel alloys, etc.), and/or any combination thereof. The housing 200, in some instances, is manufactured from a unibody structure or may be manufactured from multiple sub-components (e.g., halves). Suitable manufacturing techniques include injection molding, blow molding, cast molding, stamping, etc.

Figure 3:
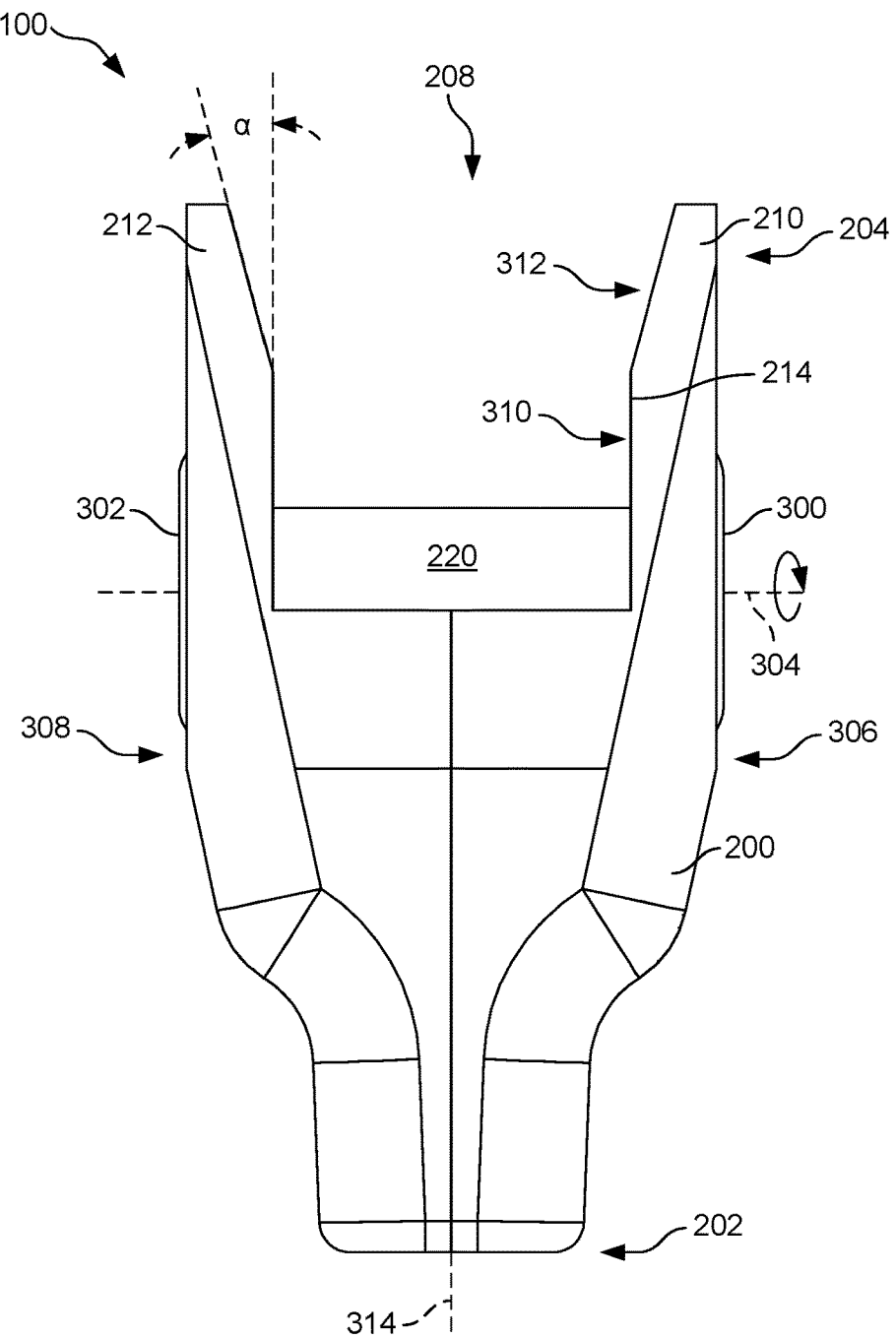
FIG. 3 illustrates a first side view of the first coupler of FIG. 1A, according to an example of the present disclosure.

FIG. 3 illustrates a first side view of the first coupler 100, which in some instances, may represent a top of the first coupler 100.

The first coupler 100 includes the housing 200 having the first end 202 and the second end 204. In some instances, and as shown, a width of the first end 202 may be less than a width of the second end 204 (X-direction). The housing 200, at the second end 204, defines the receptacle 208. As discussed above, the receptacle 208 is defined at least in part by the first arm 210 and the second arm 212. The first arm 210 and the second arm 212 further define the sidewall 214 within which the handle 110 is configured to reside.

The cabinet 220 is shown being disposed at least partially within the receptacle 208 so as to engage the handle 110. In some instances, the cabinet 220 couples to a first disc 300 and a second disc 302 that are rotatably coupled to the housing 200. For example, the housing 200 may define passages that extend at least partially through or into the housing 200. The first disc 300 may engage within a first of the passages, while the second disc 302 may engage within a second of the passages. The first disc 300 and the second disc 302 are coupled to the cabinet 220 (and therefore the magnetic element 216) and are rotatable within the passages. In doing so, the first disc 300 and the second disc 302 may provide, or assist in providing, the rotatable nature to the cabinet 220 and the magnetic element 216. As shown, the magnetic element 216, the cabinet 220, the first disc 300, and the second disc 302 may be rotatable about a rotational axis 304 (X-axis). In some instances, the magnetic element 216, the cabinet 220, the first disc 300, and the second disc 302 have a degree of pivotable movement about the rotational axis 304 between zero degrees and forty-five degrees. The degree of pivotable movement may be in the clockwise and/or counterclockwise directions.

The first disc 300 is shown residing on a first side 306 of the housing 200 while the second disc 302 is shown residing on a second side 308 of the housing 200. In some instances, the first disc 300 and the second disc 302 may be flush or planar with the first side 306 and the second side 308, respectively, or the first disc 300 and/or the second disc 302 may protrude at least partially inward or outward from the first side 306 and the second side 308, respectively.

In some instances, the sidewall 214 of the first arm 210 and the second arm 212 include a first portion 310 and a second portion 312. The first portion 310 may be substantially parallel to a longitudinal axis 314 of the housing 200, while the second portion 312 may include a taper, outward in a direction away from the longitudinal axis 314. The taper may assist in directing, channeling, or otherwise funneling the handle 110 of the pallet jack 104 into the receptacle 208 for engaging the magnetic element 216. For example, the handle 110 of the pallet jack 104 may rotated (about Z-axis). The first arm 210 and the second arm 212, and more particularly the taper, assists in guiding the handle 110 within the receptacle 208 to engage with the magnetic element 216 in stances where the handle 110 is rotated (e.g., twisted). As shown, the second portion 312 has an angle α. In some instances, the angle α may be between ten degrees and twenty degrees. However, other angles are envisioned. Between adjacent sidewalls 214 of the first portion 310, the receptacle 208 may include a first width and between adjacent sidewalls of the second portion 312, the receptacle may include a second width that is greater than the first width.

Figure 4:
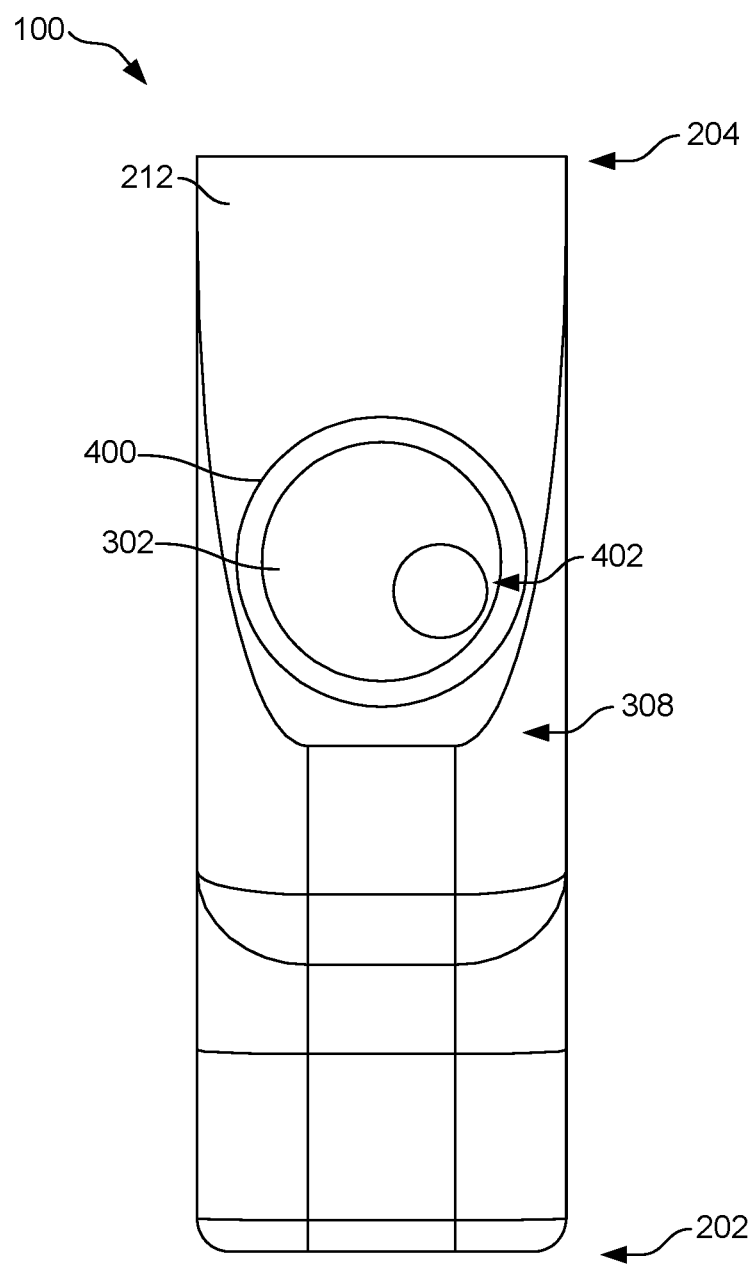
FIG. 4 illustrates a second side view of the first coupler of FIG. 1A, according to an example of the present disclosure.

FIG. 4 illustrates a side view of the first coupler 100. The side illustrated in FIG. 4 may represent the second side 308, however, the first side 306 may include similar components and function.

The second side 308 is shown including the second disc 302 that rotatable couples to the housing 200. The second disc 302 may reside within a passage 400 formed by the housing 200 (or a body of the housing 200). In some instances, the passage 400 may extend though at least a portion of the housing 200 corresponding to the second arm 212. In some instances, the passage 400 (and therefore the second disc 302), may be centered on the housing 200 between the first end 202 and the second end 204 (along the longitudinal axis 314).

The second disc 302 is shown including a channel 402 through which a wire may route. The wire may deliver power to the magnetic element 216. In such instances, the wire may route external to the housing 200, from the AGV 108, and pass through or engage within the channel 402. In doing so, the wire may couple to the magnetic element 216 for delivering power. The wire may include sufficient slack to allow the second disc 302 to rotate. The channel 402, in other embodiments, may be disposed through the housing 200 or other portion of the first coupler 100. As such, the wire may be routed elsewhere on or within the housing 200 for providing power to the magnetic element.

Figure 5A:
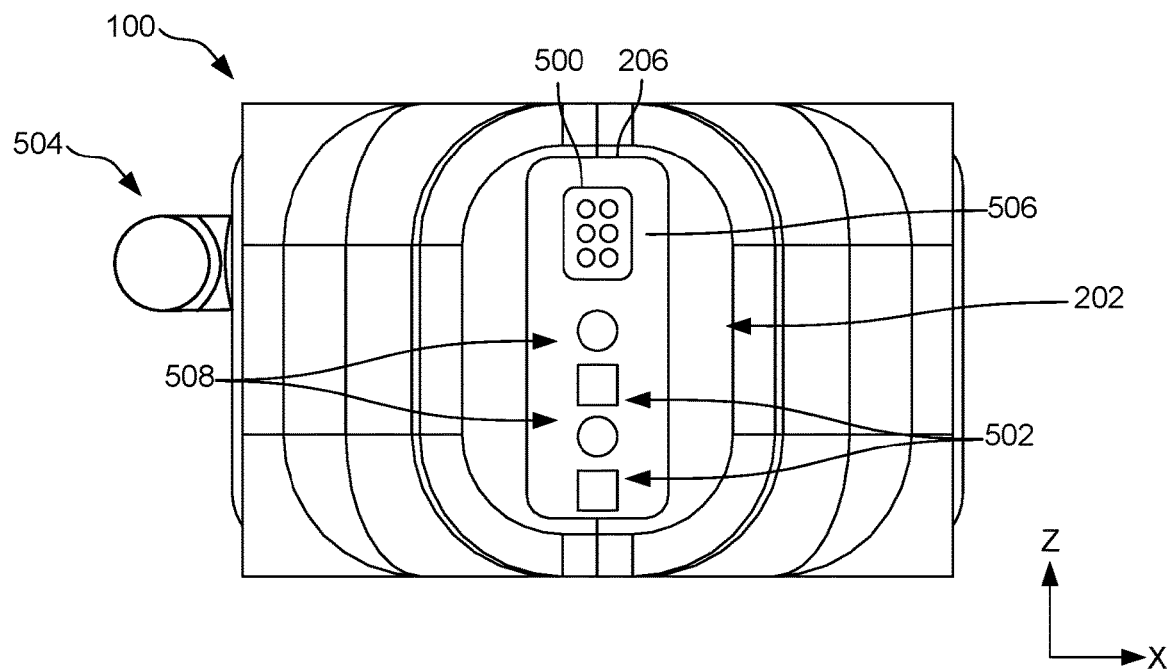
FIG. 5A illustrates a first end view of the first coupler of FIG. 1A, according to an example of the present disclosure.
Figure 5B:
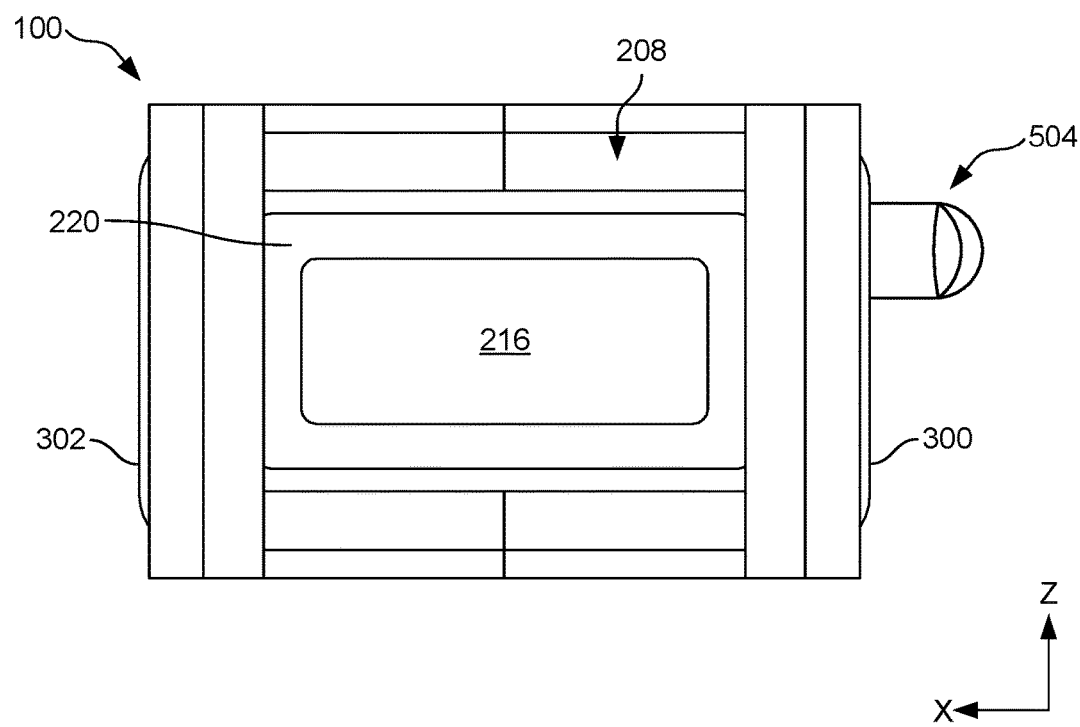
FIG. 5B illustrates a second end view of the first coupler of FIG. 1A, according to an example of the present disclosure.

FIGS. 5A and 5B illustrate end views of the first coupler 100. In particular, FIG. 5A illustrates an end view of the first end 202, while FIG. 5B illustrates an end view of the second end 204.

The first end 202 is shown including the socket 206 for coupling to the bar 106 extending from the AGV 108. In some instances, a connector 500 resides within the socket 206 for communicatively coupling the AGV 108 and the first coupler 100. For example, in some instances, power may be routed between the AGV 108 and the first coupler 100 via the connector 500. However, as discussed above, power may be routed external to the housing 200.

Additionally, the first coupler 100 may include sensor(s) 502 (e.g., proximity, force, light, etc.) for measuring whether the magnetic element 216 has contacted or engaged with the handle 110. For example, upon the magnetic element 216 being within a threshold proximity of the handle 110, or the magnetic element 216 pushing against the handle 110 with a threshold amount of force, the magnetic element 216 may be powered on to engage within the handle 110. In such instances, signals (or other information) may be transmitted from the sensor(s) 502 to the AGV 108 via the connector 500. In turn, the AGV 108 may process the signals for determining whether to power on or power off the magnetic element 216.

As shown in FIGS. 5A and 5B, a wire 504 may deliver power to the magnetic element 216. The wire 504 may route from the AGV 108, internal or external from the bar 106, and/or at least partially internal or external to the housing 200. In such instances, the wire 504 may route alongside the second side 308 of the housing 200. The wire 504 is disposed through the channel 402 in the second disc 302 for coupling to the magnetic element 216 and delivering power. The wire 504 is configured to be rotatable with the second disc 302, as well as the magnetic element 216, the cabinet 220, and the first disc 300. Although the wire 504 is shown on the second side 308, additionally or alternatively, a wire may be routed along the first side 306 and disposed through a corresponding channel in the first disc 300 for coupling to the magnetic element 216. Further, the wire 504 may be routed differently than shown (e.g., along a top or bottom of the housing 200, internal to the housing 200, and so forth).

In FIG. 5A, biasing members 508 are shown extending from a bottom 506 of the socket 206 in a direction towards the first end 202. The biasing members 508 may engage with an end of the bar 106 so as to be compressible (Y-direction). The biasing members 508 may be used as a way to actuate the magnetic element 216. As the magnetic element 216 (or other portion of the first coupler 100) contacts the handle 110, for example, the biasing members 508 compress. In response, the bar 106 may slidably engage within the socket 206 (e.g., so as to move further into the socket 206 towards the base 218). This compression of the biasing members 508 may be sensed by the sensor(s) 502, and signals indicative of the compression may be transmitted to the AGV 108 (e.g., via the connector 500). In response to receiving the signal(s), the AGV 108 may cause power to be supplied to the magnetic element 216. As a result, the magnetic element 216 may engage with the handle 110 of the pallet jack 104.

In other words, in FIG. 5A, sensor(s) 502 are also shown being disposed on the bottom 506 of the socket 206. As the biasing members 508 are compressed, the bar 106 may engage with the sensor(s) 502. In response, the sensor(s) 502 may generate a signal that is supplied to the AGV 108. In some instances, the sensor(s) 502 represent force sensor(s), capacitive sensor(s), proximity sensor(s), and the like. The sensor(s) 502 may include any number of sensors, such as one, two, three, etc.

Although the biasing members 508 are shown at a particular location, the biasing members 508 may be located elsewhere on or within the first coupler 100. For example, the biasing members 508 may be located within the cabinet 220, interposed between the cabinet 220 and the base 218 of the receptacle 208, and so forth. In such instances, the biasing members 508 may similarly be compressed when the first coupler 100 comes into contact with the pallet jack 104. Additionally, more than two biasing members 508 may be included.

The second end 204 is shown having the receptacle 208 for receiving the handle 110. The first disc 300 and the second disc 302 also rotatably couple to the cabinet 220 via passages formed within the housing 200.

Figure 6:
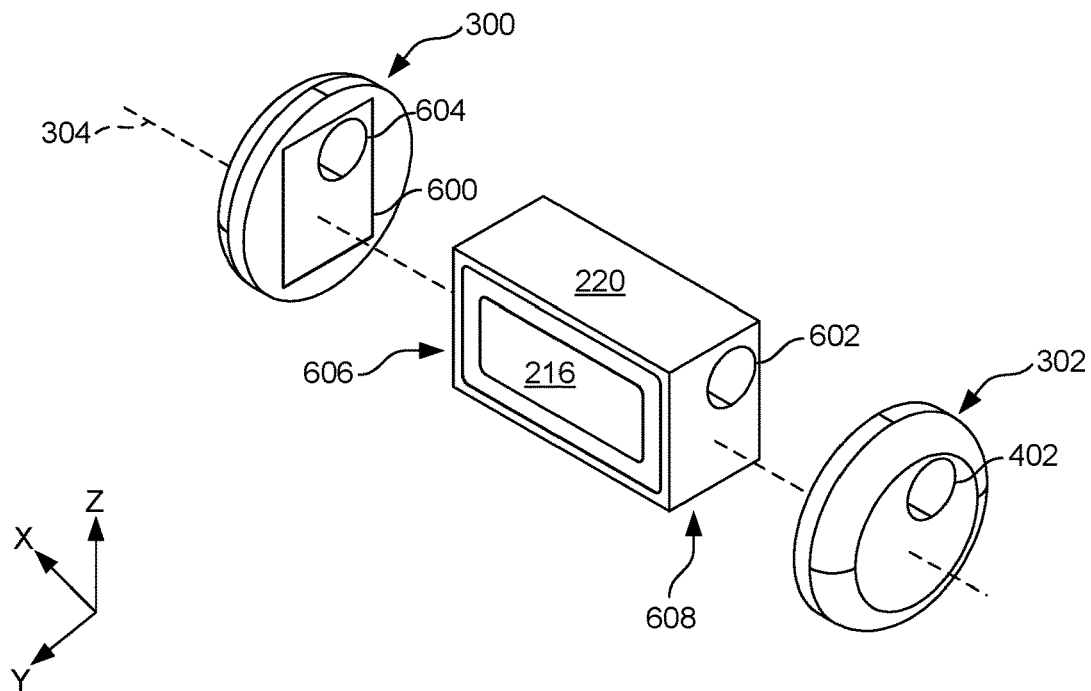
FIG. 6 illustrates a partially exploded view of the first coupler of FIG. 1A, according to an example of the present disclosure.

FIG. 6 illustrates a partially exploded view of components of the first coupler 100, such as the magnetic element 216, the cabinet 220, the first disc 300, and the second disc 302.

As introduced above, the magnetic element 216, the cabinet 220, the first disc 300, and the second disc 302 are configured to couple together and rotate about the rotational axis 304. For example, the first disc 300 and the second disc 302 may couple to opposing ends of the cabinet 220. The first disc 300 may at least partially reside within a first passage extending through the housing 200 (e.g., the passage 400) and the second disc 302 may at least partially reside within a second passage extending through the housing 200 (e.g., the passage 400). As shown, the first disc 300 and the second disc 302 may be circular in nature so as to rotate within the passages of the housing 200. However, in some instances, the first disc 300 and/or the second disc 302 may include differently shapes, or different portions of the first disc 300 and/or the second disc 302 may engage within the housing 200 for providing rotation to the magnetic element 216.

The first disc 300 and the second disc 302 may include a chamber that receives at least a portion of the cabinet 220. The chamber may include a corresponding shape or perimeter as the cabinet 220 (e.g., square). For example, as shown, the first disc 300 includes a chamber 600 formed within an inner surface of the first disc 300. A first end 606 of the cabinet 220 may reside within the chamber 600, such that the first disc 300 couples to the cabinet 220. In some instances, the cabinet 220 is further coupled to the first disc 300 via adhesives, press fit, snap fit, etc. Although not shown, the second disc 302 may include a corresponding chamber that receives a second end 608 of the cabinet 220.

The second disc 302 is shown including the channel 402 that extends through the second disc 302, between an outer surface and an inner surface of the second disc 302. In some instances, the wire 504 routes though the channel 402 for coupling to the magnetic element 216. The cabinet 220 also includes a passage 602 that aligns with the channel 402. As such, the wire 504 may be routed through the channel 402 and the passage 602 for providing power to the magnetic element 216 within the cabinet 220. The first disc 300 may also include a channel 604 through which an additional or alternative wire may route. Although not shown, the first end 202 of the cabinet 220 may include a corresponding passage through which the wire may route.

Figure 7:
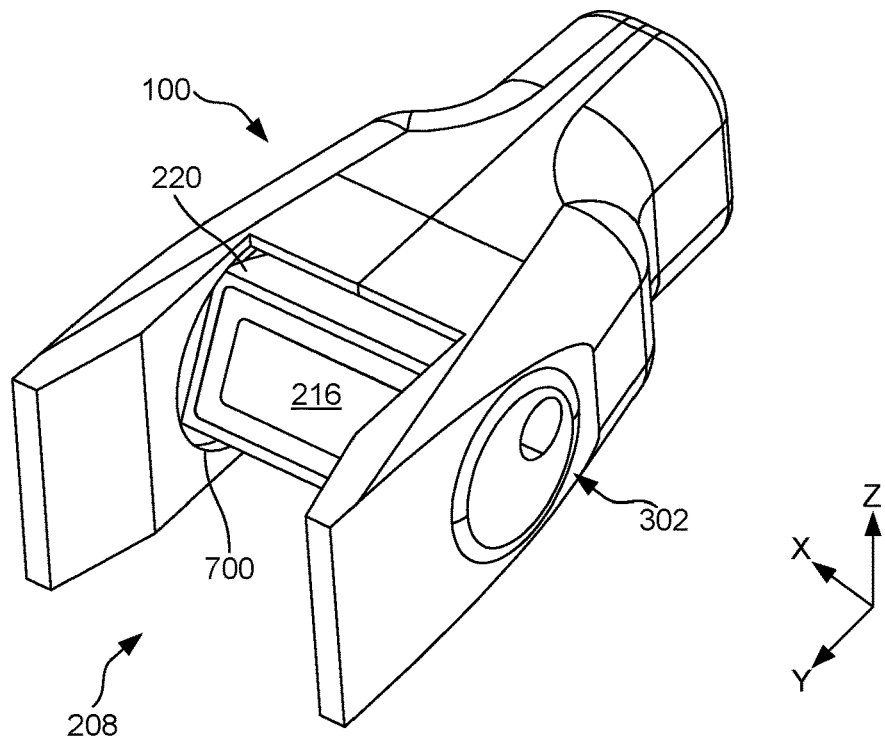
FIG. 7 illustrates a third perspective view of the first coupler of FIG. 1A, showing a magnetic element rotationally coupled within the first coupler, according to an example of the present disclosure.

FIG. 7 illustrates the first coupler 100, showing the magnetic element 216 rotated to accommodate for a rotation of the handle 110. As shown, and as discussed above, the magnetic element 216 is configured to rotate within the receptacle 208 via the first disc 300 and the second disc 302 coupled to the cabinet 220. For example, the first disc 300 and the second disc 302 may respectively rotate within passages that extend through the housing 200. An example passage 700 is shown in FIG. 7 within which at least a portion of the first disc 300 resides and within which the first disc 300 is configured to rotate. The second disc 302 may reside within a corresponding passage. Additionally, given the coupling of the first disc 300 and the second disc 302 to the cabinet 220, wire(s) 504 coupled to the magnetic element 216 may corresponding rotate as well.

FIG. 8 illustrates the first coupler 100 coupled to the AGV 108. As shown, the first coupler 100 couples to the bar 106 extending from the AGV 108. For example, the first end 202 of the first coupler 100 may couple to an end of the bar 106. An opposite end of the bar 106 may couple to a rotational bracket 800 of the AGV 108. The rotational bracket 800 may represent joints, swivels, and the like that provide rotational movement to the bar 106 (e.g., about the Z-axis). As the AGV 108 traverses about an environment, the rotational bracket 800 may rotate to pull the pallet jack 104. The rotation may maintain contact, and therefore an engagement, between the magnetic element 216 and the handle 110.

The bar 106 may extend from the AGV 108 at a corresponding height for engaging with the handle 110, which is spaced vertically above a ground surface on which the wheel(s) 114 of the pallet jack 104 engage. In some instances, the bar 106 may be moveable in one or more directions (e.g., Y-direction and/or Z-direction). For example, the bar 106 may extend outward from the AGV 108 in a direction for engaging with the handle 110 (Y-direction) and/or extend upward from the AGV 108 for engaging with the handle 110.

A detailed view 802 of an engagement between the first coupler 100 and the handle 110 is shown in FIG. 8. The detailed view 802 illustrates that the handle 110 resides within the receptacle 208 of the first coupler 100 and enters the receptacle 208 from the second end 204 of the first coupler 100. Additionally, the handle 110 is shown being rotated from a vertical upright position (e.g., planar with the Y-plane), in a direction towards the AGV 108. That is, as the AGV 108 pulls the pallet jack 104, the handle 110 may rotate in a direction towards the AGV 108 (about the X-axis). The magnetic element 216 (as well as the cabinet 220, the first disc 300, and the second disc 302) rotates within the housing 200 to maintain contact with the handle 110.

Figure 9A:
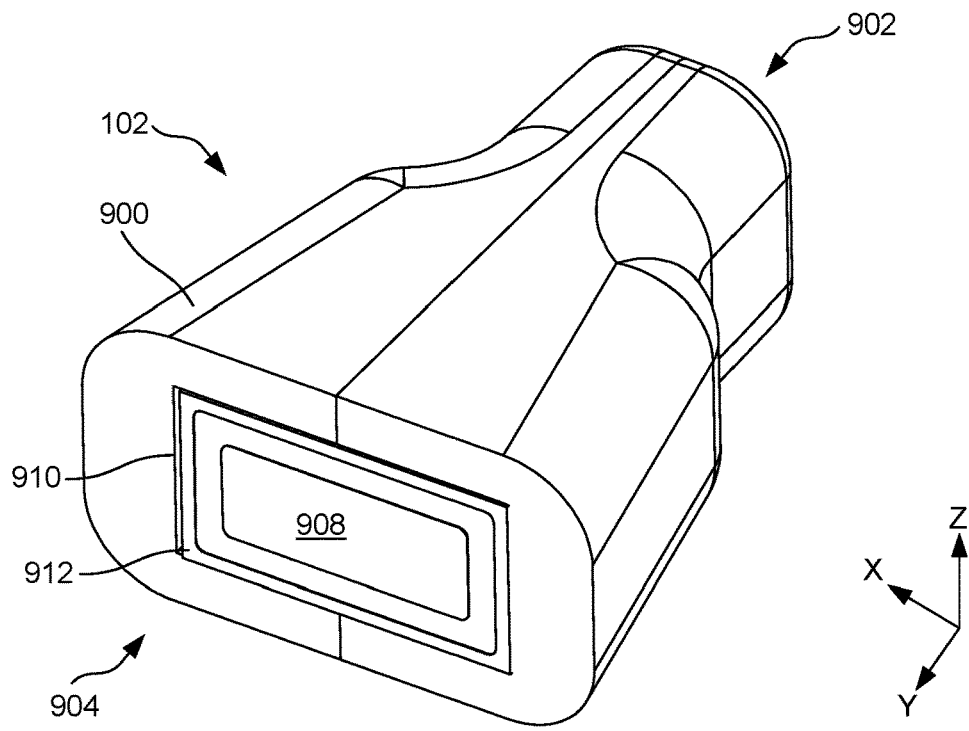
FIG. 9A illustrates a first perspective view of the second coupler of FIG. 1, according to an example of the present disclosure.
Figure 9B:
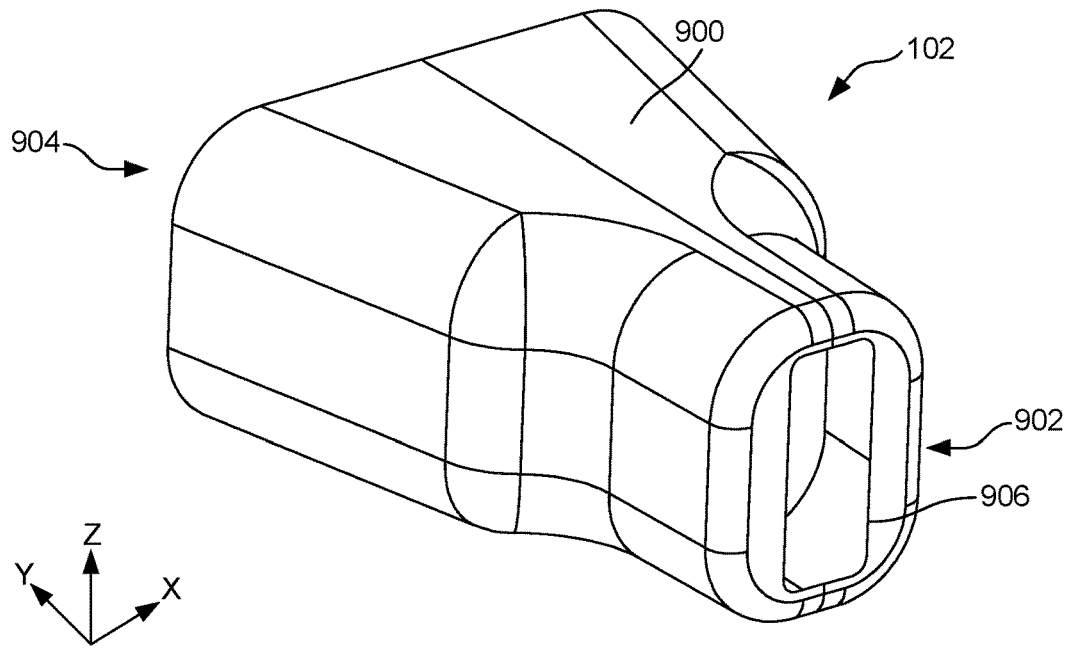
FIG. 9B illustrates a second perspective view of the second coupler of FIG. 1B, according to an example of the present disclosure.

FIGS. 9A and 9B illustrate perspective views of the second coupler 102. In some instances, FIG. 9A illustrates a front perspective view of the second coupler 102 and FIG. 9B illustrates a rear perspective view of the second coupler 102.

The second coupler 102 is shown including a housing 900 having a first end 902 and a second end 904. The first end 902 is configured to couple to the bar 106 of the AGV 108. For example, in some instances, the first end 902 includes a socket 906 within which the bar 106 engages. The bar 106 may removably couple to second coupler 102, within the socket 906, via fasteners, for example. In other instances, the bar 106 may be a component of the second coupler 102 and permanently couple to the second coupler 102. In such instances, the bar 106 and the second coupler 102 may couple to the AGV 108 as a single unit. The socket 906 includes a corresponding shape that is complimentary to the bar 106. Additionally, the socket 906 may include a depth (e.g., Y-direction) into which an end of the bar 106 is placed.

The second end 904 includes a magnetic element 908 that engages with the foot guard 112 of the pallet jack 104. The magnetic element 908 may reside within a receptacle 910 positioned at the second end 904 of the housing 900. Within the receptacle 910, the magnetic element 908 is depressible. As such, the magnetic element 908 may extend from and retract into the receptacle 910. As discussed herein, extension of the magnetic element 908 may come by way of biasing elements (e.g., springs) disposed within the receptacle 910. In some instances, the magnetic element 908 resides within (or is disposed within) a cabinet 912. The cabinet 912 may prevent damage to the magnetic element 908, provide structural support to the magnetic element 908, and/or couple the magnetic element 908 to the housing 900.

In some instances, the magnetic element 908 represents an electromagnet that is configured to be powered on and off. Power may be delivered to the magnetic element 908 via the AGV 108. The electromagnet may be a DC electromagnet connected to a DC voltage source onboard the AGV 108. For example, one or more wires, cables, etc. may route power from the AGV 108 to the magnetic element 908. The AGV 108 may selectively supply and restrict power to the magnetic element 908 to couple and decouple from the foot guard 112, respectively. That is, to couple to the foot guard 112, power may be supplied to the magnetic element 908, and to decouple from the foot guard 112 (e.g., upon arriving at a drop off location), power may be restricted to the magnetic element 908. In some instances, the cables that route power may be routed within the socket 906 and the bar 106, as well as through the housing 900 to the magnetic element 908. Additionally, or alternatively, the cables may route from the AGV 108 to the second coupler 102, external to the housing 900 and/or the bar 106.

In some instances, the housing 900 may be manufactured from a plurality of materials including plastic (e.g., polyethylene terephthalate (PET), polycarbonate (PC), polypropylene (PP), etc.), composites (e.g., carbon fiber), nonferrous metal (e.g. aluminum, nickel alloys, etc.), and/or any combination thereof. The housing 900, in some instances, is manufactured from a unibody structure or may be manufactured from multiple sub-components (e.g., halves). Suitable manufacturing techniques include injection molding, blow molding, cast molding, stamping, etc.

Figure 10A:
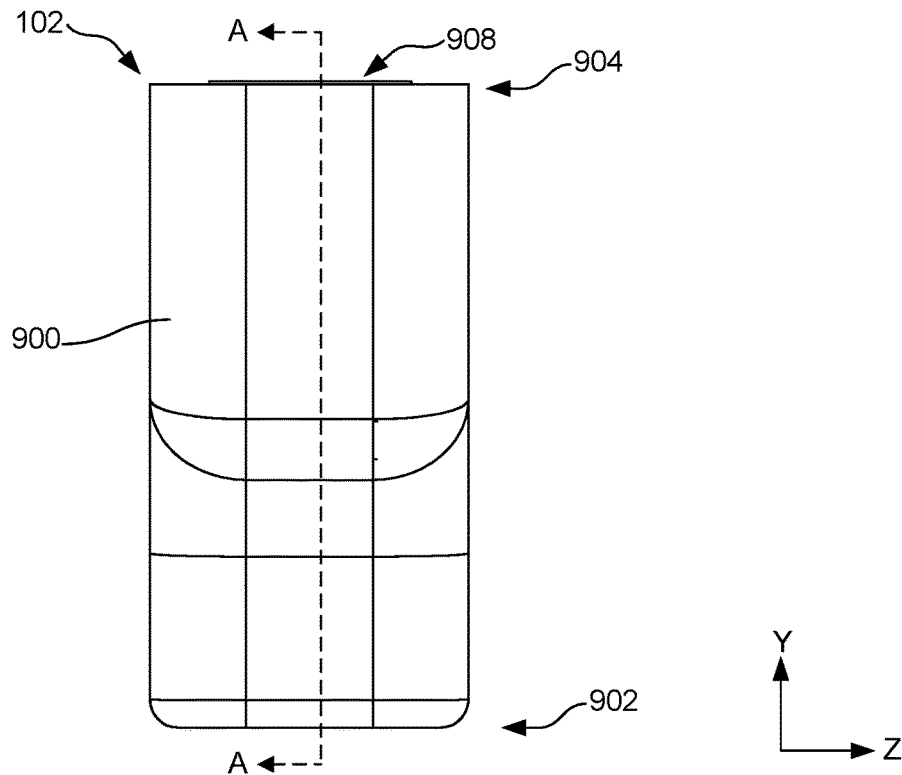
FIG. 10A illustrates a first side view of the second coupler of FIG. 1B, according to an example of the present disclosure.
Figure 10B:
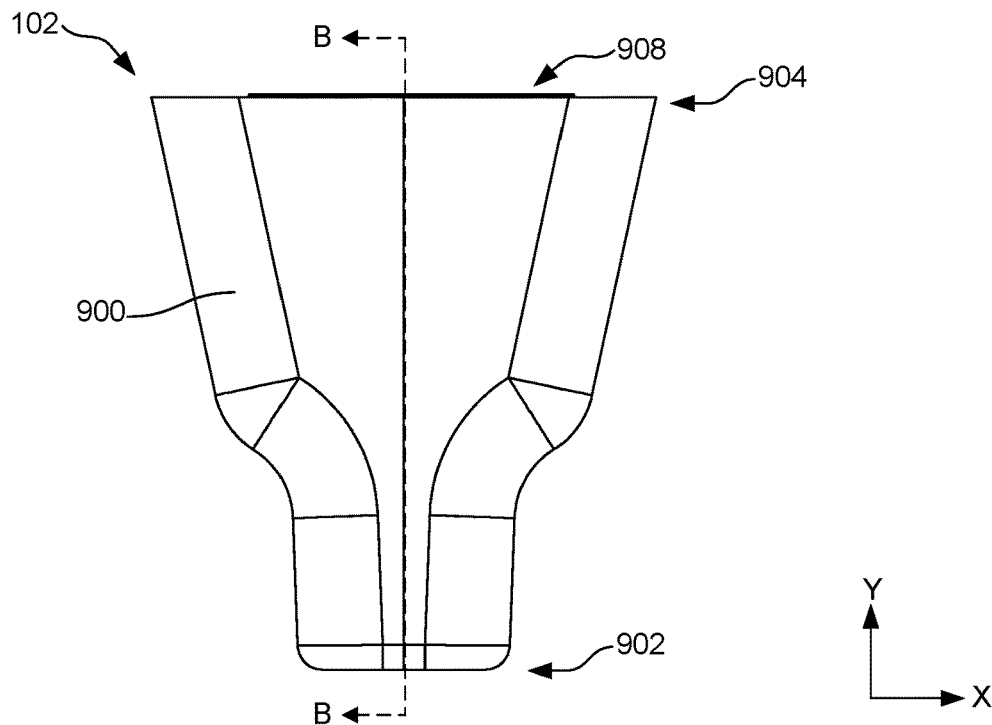
FIG. 10B illustrates a second side view of the second coupler of FIG. 1B, according to an example of the present disclosure.

FIGS. 10A and 10B illustrate various views of the second coupler 102. For example, FIG. 10A may illustrate a side view of the second coupler 102, while FIG. 10B may illustrate a top or bottom view of the second coupler 102.

The magnetic element 908 is shown at least partially protruding from the second end 904 of the second coupler 102 (Y-direction) for engaging with the foot guard 112. Additionally details of the protrusion of the magnetic element 908 are discussed with regard to FIGS. 12A-12C, 13A, and 13B. FIG. 10A illustrates a line A-A extending through the housing 900 and FIG. 10B illustrates a line B-B extending through the housing 900. Line A-A and line B-B are used to illustrate cross-sectional views of the second coupler 102, which are discussed in FIGS. 12A-12C.

In some instances, along a longitudinal length of the second coupler 102 (Y-direction), the housing 900 may taper outwards from the first end 902 to the second end 904. As such, the first end 902 may include a width (X-direction) that is less than a width (X-direction) of the second end 904. However, in some instances, the housing 900 may include a substantially constant depth (Z-direction).

Figure 11A:
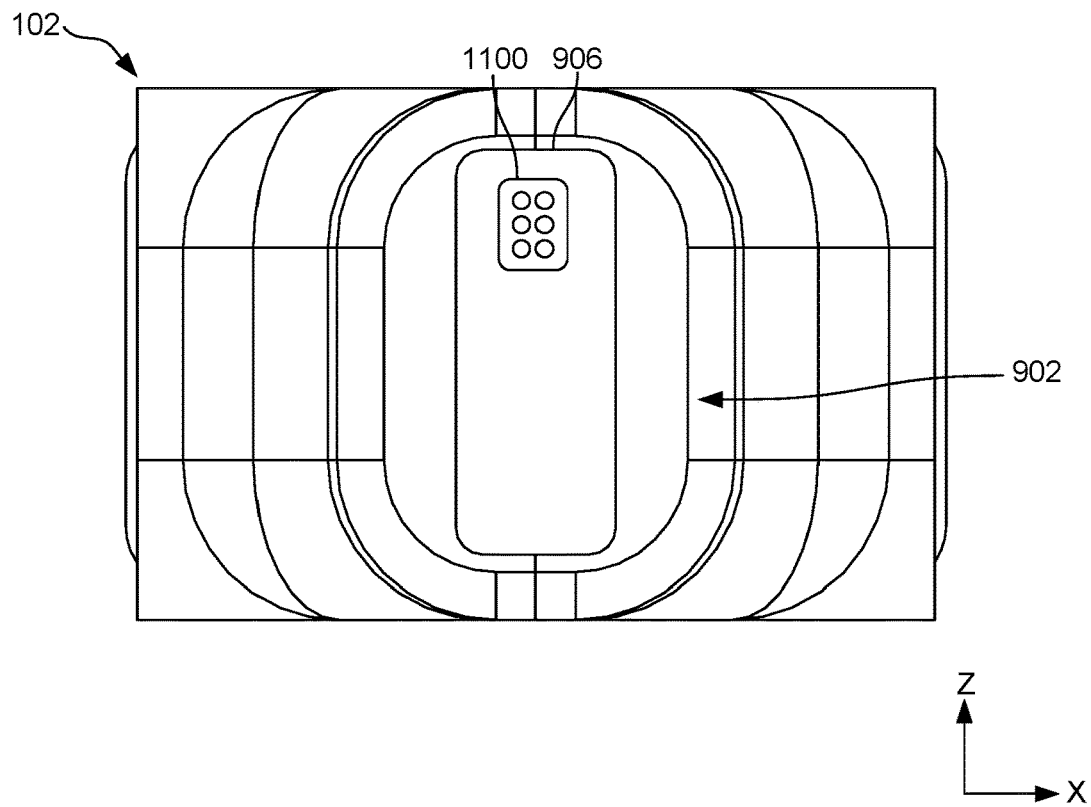
FIG. 11A illustrates a first end view of the second coupler of FIG. 1B, according to an example of the present disclosure.
Figure 11B:
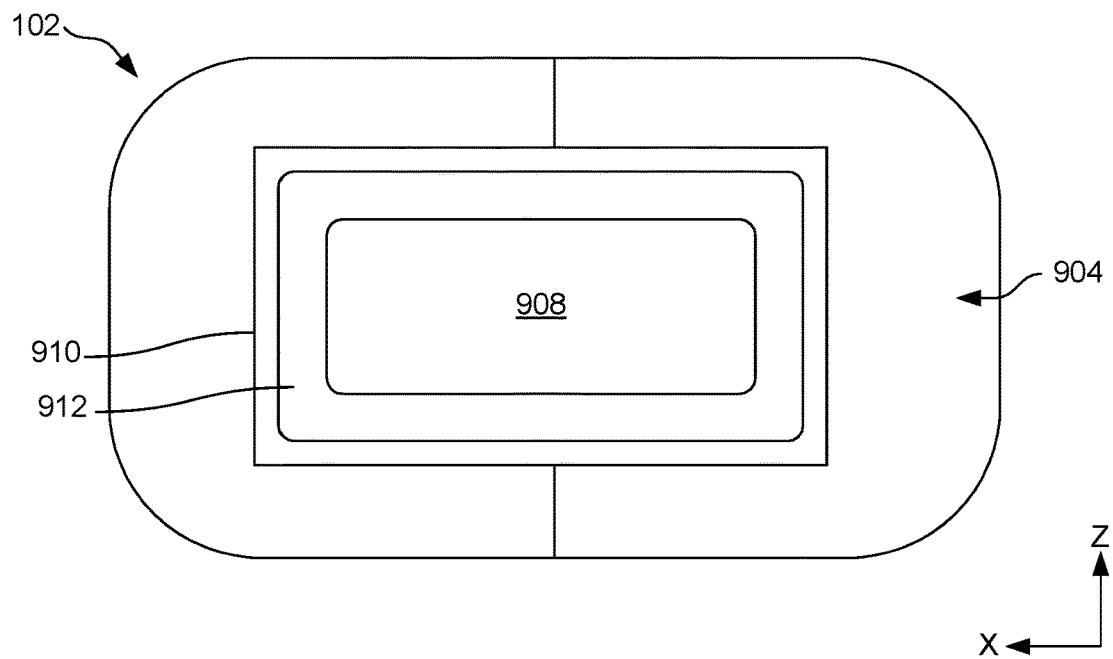
FIG. 11B illustrates a second end view of the second coupler of FIG. 1B, according to an example of the present disclosure.

FIGS. 11A and 11B illustrate end views of the second coupler 102. In particular, FIG. 11A illustrates an end view of the first end 902, while FIG. 11B illustrates an end view of the second end 904.

The first end 902 is shown including the socket 906 for coupling to the bar 106 extending from the AGV 108. In some instances, a connector 1100 resides within the socket 906 for communicatively coupling the AGV 108 and the second coupler 102. For example, in some instances, power may be routed between the AGV 108 and the second coupler 102 via the connector 1100. Additionally, the second coupler 102 may include sensor(s) (e.g., proximity, force, light, etc.) for measuring whether the magnetic element 908 has contacted or engaged with the foot guard 112. For example, upon the magnetic element 908 being within a threshold proximity of the handle 110, or the magnetic element 908 pushing against the foot guard 112 with a threshold amount of force, the magnetic element 908 may be powered on to engage within the foot guard 112. In such instances, signals (or other information) may be transmitted from the sensor(s) to the AGV 108 via the connector 1100. In turn, the AGV 108 may process the signals for determining whether to power on or power off the magnetic element 908.

The second end 904 is shown having the receptacle 910 for receiving the cabinet 912 and the magnetic element 908. The cabinet 912 and the magnetic element 908 may be depressible within the receptacle 910 (Y-direction into page).

FIGS. 12A-12C illustrate various cross-sectional views of the second coupler 102. In FIG. 12A, a cross-sectional view of the second coupler 102 is shown, taken along line A-A of FIG. 10A. FIG. 12B illustrates a cross-sectional view of the second coupler 102 taken along line B-B of FIG. 10B. FIG. 12C illustrates a cross-sectional view of the second coupler 102, taken along like B-B of FIG. 10B, showing a detailed view of the second end 904. In FIGS. 12A and 12B, the cabinet 912 and the magnetic element 908 are shown removed from the housing 900 to illustrate the receptacle 910.

The receptacle 910 is shown extending into the housing 900 from the second end 904 (or a surface on the second end 904). The receptacle 910 includes sidewalls 1200 that laterally surround at least a portion of the cabinet 912 and the magnetic element 908 when placed within the receptacle 910. Additionally, the receptacle 910 includes a base 1202 that is spaced apart from the second end 904 of the second coupler 102 (Y-direction). The receptacle 910 is shown including a rectangular shape for accommodating a corresponding rectangular shape of the cabinet 912 and the magnetic element 908. However, other shapes are envisioned (e.g., square, cylindrical, etc.).

Biasing members 1204 are shown extending from the base 1202 in a direction towards the second end 904. The biasing members 1204 engage with the cabinet 912 to bias the cabinet 912 (and the magnetic element 908) in a direction towards the second end 904 (or out the receptacle 910). However, the biasing members 1204 may be coupled to the cabinet 912 and/or the base 1202 to maintain a position within the receptacle 910. In such instances, the biasing members 1204 may at least partially couple the cabinet 912 to the housing 900.

In FIG. 12C, a bottom 1206 of the cabinet 912 is shown spaced apart from the base 1202 of the receptacle 910. The biasing members 1204 are shown disposed between the base 1202 and the bottom 1206 of the cabinet 912 for urging the cabinet 912 and the magnetic element 908 in a direction towards a top surface 1208 the housing 900 at the second end 904. In doing so, and as illustrated in FIG. 12C, a top surface 1210 of the magnetic element 908 (and/or the cabinet 912) may protrude or extend beyond the top surface 1208 of the housing 900. Although FIG. 12C illustrates the biasing members 1204 engaging with the bottom 1206 of the cabinet 912, in some instances, the biasing members 1204 may engage with a bottom of the magnetic element 908.

In some instances, the biasing members 1204 may be used as a way to actuate the magnetic element 908. For example, the magnetic element 908 may include an electromagnet and wires may route to the magnetic element 908 for supplying power (e.g., from the bottom 1206 and through the housing 900, from the sidewall 1200 of the receptacle 910, and so forth). In such instances, the wires may route into the receptacle 910 from the sidewalls 1200 and/or the base 1202. The housing 900 may include passages or channels through which the wires route.

In an extended state of the magnetic element 908, such as that shown in FIG. 12C, the magnetic element 908 may not be powered. However, as the magnetic element 908 contacts the foot guard 112, for example, the magnetic element 908 moves into the receptacle 910 and compresses the biasing members 1204. This compression of the biasing members 1204 may be sensed by one or more sensor(s) 1212, and signals indicative of the compression may be transmitted to the AGV 108 (e.g., via the connector 1100). In response to receiving the signal(s), the AGV 108 may cause power to be supplied to the magnetic element 908. As a result, the magnetic element 908 may engage with the foot guard 112 of the pallet jack 104.

In FIG. 12A, the sensor(s) 1212 are also shown being disposed on the base 1202 of the receptacle 910. As the biasing members 1204 are compressed, the magnetic element 908 and/or the cabinet 912 may engage with the sensor(s) 1212. In response, the sensor(s) 1212 may generate a signal that is supplied to the AGV 108. Wires, for example, may route between the sensor(s) 1212 and the connector 1100 for communicatively coupling the sensor(s) 1212 to the AGV 108. In some instances, the sensor(s) 1212 represent force sensor(s), capacitive sensor(s), proximity sensor(s), and the like. The sensor(s) 1212 may include any number of sensors, such as one, two, three, etc.

Although the biasing members 1204 are shown at a particular location, the biasing members 1204 may be located elsewhere on the second coupler 102. For example, the biasing members 1204 may be located in the socket 906. In such instances, the biasing members 1204 may similarly be compressed when the second coupler 102 comes into contact with the pallet jack 104. In another instances, the biasing members 1204 may extend from the top surface 1208 of the housing 900. As the biasing members 1204, or pins extending from the second end 904 come into contact with the pallet jack 104, the biasing members 1204 may compress and the magnetic element 908 may be charged. Additionally, more than two biasing members 1204 may be included.

Figure 13A:
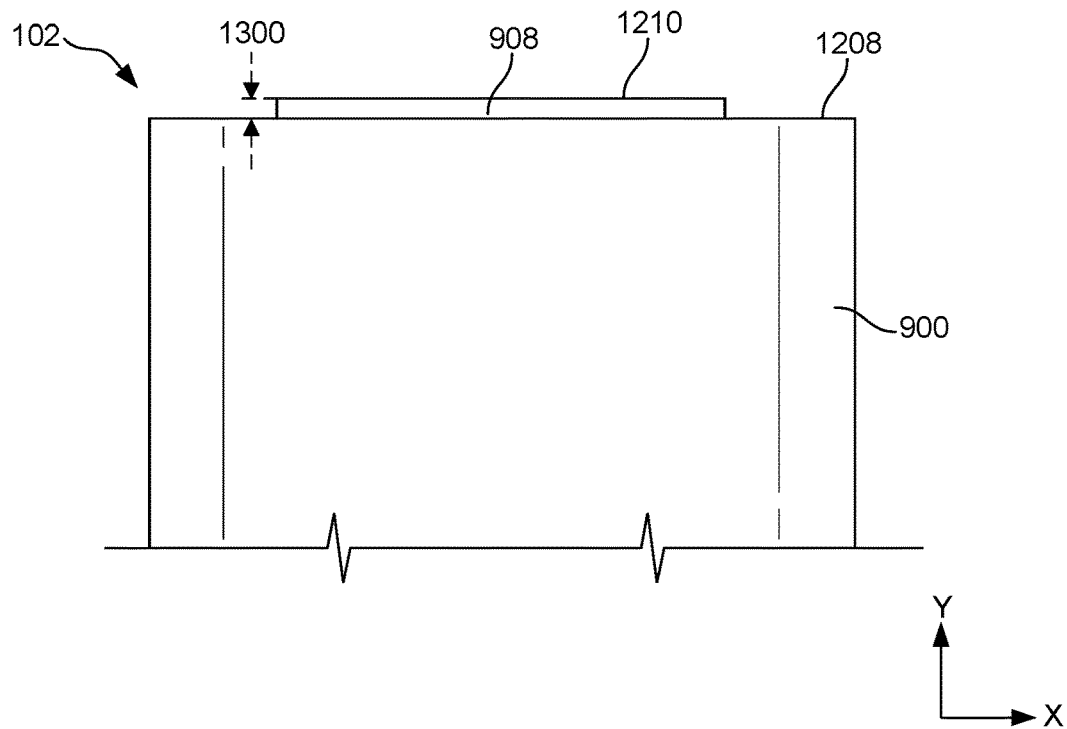
FIG. 13A illustrates a partial view of an end of the second coupler of FIG. 1B, showing a magnetic element being disposed out the end, according to an example of the present disclosure.
Figure 13B:
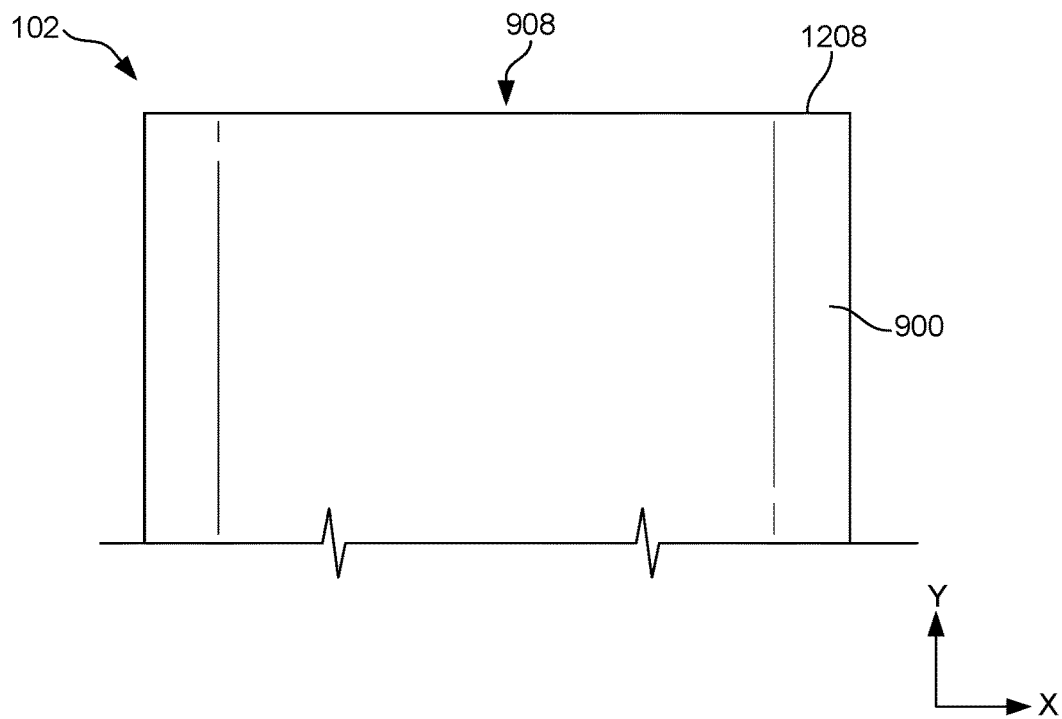
FIG. 13B illustrates a partial view of an end of the second coupler of FIG. 1B, showing a magnetic element being retracted within the end, according to an example of the present disclosure.

FIGS. 13A and 13B illustrate the magnetic element 908 protruding from the second end 904. As noted above, the magnetic element 908 may be encased at least partially within the cabinet 912.

In FIG. 13A, the top surface 1210 of the magnetic element 908 is shown protruding from the receptacle 910 or extending beyond the top surface 1208 of the housing 900 by a distance 1300. In some instances, the distance 1300 is within a range of approximately 0.25 inches to 0.75 inches. The distance 1300 is provided at least in part by the biasing members 1204 contacting the cabinet 912 and urging the magnetic element 908 at least partially out of the receptacle 910. As the second coupler 102 comes into contact with the foot guard 112, for example, the force urges the magnetic element 908 into the receptacle 910, as shown in FIG. 13B. That is, in FIG. 13B, the magnetic element 908 may reside substantially completely within the receptacle 910. In such instances, when the magnetic element 908 compresses between approximately 0.25 inches to 0.75 inches, the magnetic element 908 may be powered on to engage the foot guard 112.

As the magnetic element 908 is biased into the receptacle 910, the AGV 108 may cause power to be supplied to the magnetic element 908 for engaging (e.g., attracting) the foot guard 112. In such instances, the second coupler 102 becomes magnetically coupled to the foot guard 112. As discussed herein, the sensor(s) 1212 may measure the compression of the biasing members 1204, a proximity of the magnetic element 908 to the base 1202 of the receptacle 910, or a position of the magnetic element 908 within the receptacle 910 for causing power to be supplied and restricted, respectively. For example, in FIG. 13A power may not be supplied to the magnetic element 908, whereas in FIG. 13B, power may be supplied to the magnetic element 908. As such, the magnetic element 908 may be moveable from a first position (e.g., extended state) in which power is restricted to the magnetic element 908 (FIG. 13A), and a second position (e.g., retracted state) in which power is supplied to the magnetic element 908 (FIG. 13B).

Figure 14:
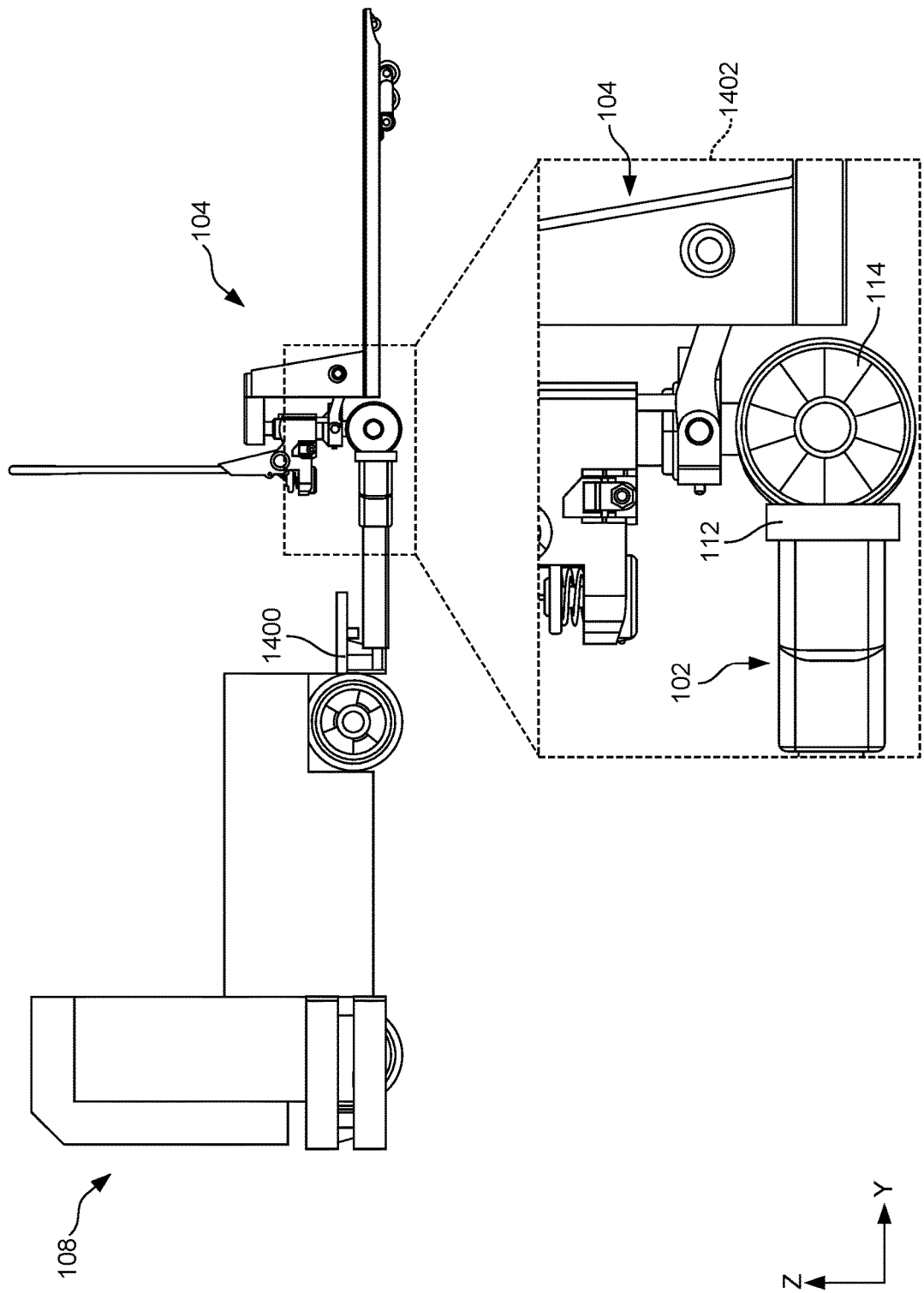
FIG. 14 illustrates a robotic device, such as an autonomous guided vehicle, attached to the second coupler of FIG. 1B for coupling to the pallet jack, according to an example of the present disclosure.

FIG. 14 illustrates the second coupler 102 coupled to the AGV 108. As shown, the second coupler 102 couples to the bar 106 extending from the AGV 108. For example, the first end 902 of the second coupler 102 may couple to an end of the bar 106. An opposite end of the bar 106 may couple to a rotational bracket 1400 of the AGV 108. The rotational bracket 1400 may represent joints, swivels, and the like that provides rotational movement to the bar 106 (e.g., about the Z-axis). As the AGV 108 traverses about an environment, the rotational bracket 1400 may rotate to pull the pallet jack 104. The rotation may maintain contact, and therefore an engagement, between the magnetic element 908 and the foot guard 112.

The bar 106 may extend from the AGV 108 at a corresponding height for engaging with the foot guard 112, which is spaced vertically above a ground surface on which wheel(s) 114 of the pallet jack 104 engage. In some instances, the bar 106 may be moveable in one or more directions (e.g., Y-direction and/or Z-direction). For example, the bar 106 may extend outward from the AGV 108 in a direction for engaging with the foot guard 112 (Y-direction) and/or extend upward from the AGV 108 for engaging with the foot guard 112. A detailed view 1402 of an engagement between the second coupler 102 and the foot guard 112 is shown in FIG. 14. The detailed view 1402 illustrates that the second coupler 102 engages with the foot guard 112.

Figure 15:
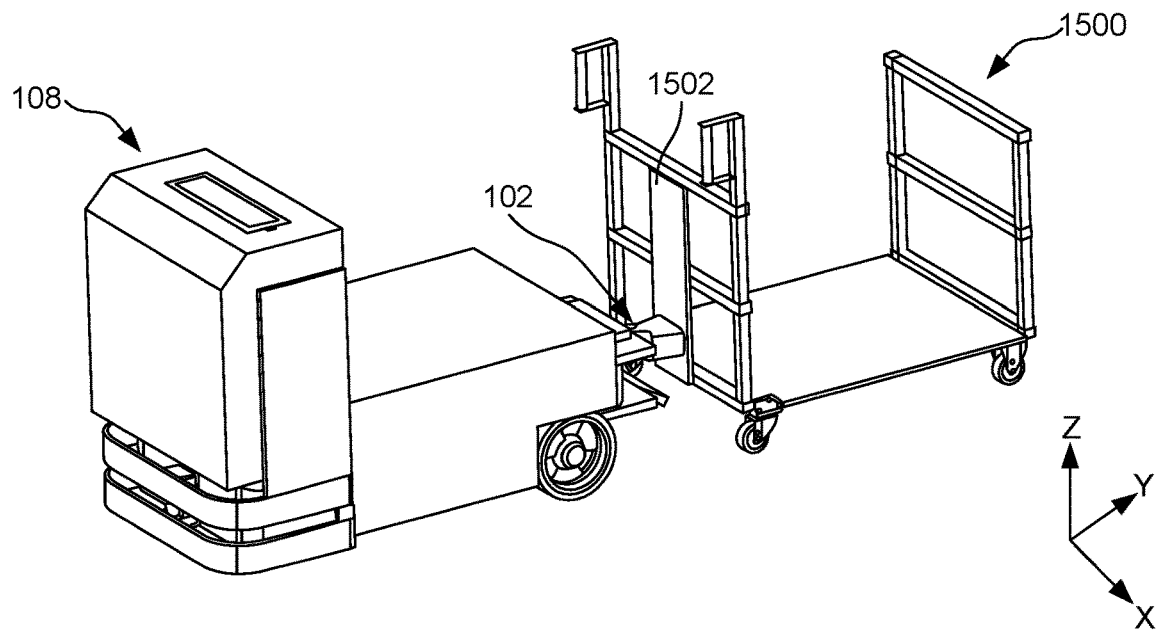
FIG. 15 illustrates a robotic device, such as an autonomous guided vehicle, attached to the second coupler of FIG. 1B for coupling to a first utility cart, according to an example of the present disclosure.

FIG. 15 illustrates the AGV 108 coupling to a utility cart 1500, such as a U-shaped utility cart, using the second coupler 102. The utility cart 1500, for example, may be configured to carry or otherwise haul goods, items, objects, etc. As similarly described above, the second coupler 102 may extend from the AGV 108 via the bar 106. In FIG. 15, the second coupler 102 is shown engaging with a frame 1502 or other structure component of the utility cart 1500. For example, the magnetic element 908 of the second coupler 102 may engage with the frame 1502. The position of the bar 106 on the AGV 108 may be varied (e.g., in the Z-direction) to engage with a respective portion of the utility cart 1500. FIG. 15 therefore illustrates that the second coupler 102 may be used to engage with carts, wagons, carriages, and so forth other than the pallet jack 104, as described above.

Figure 16:
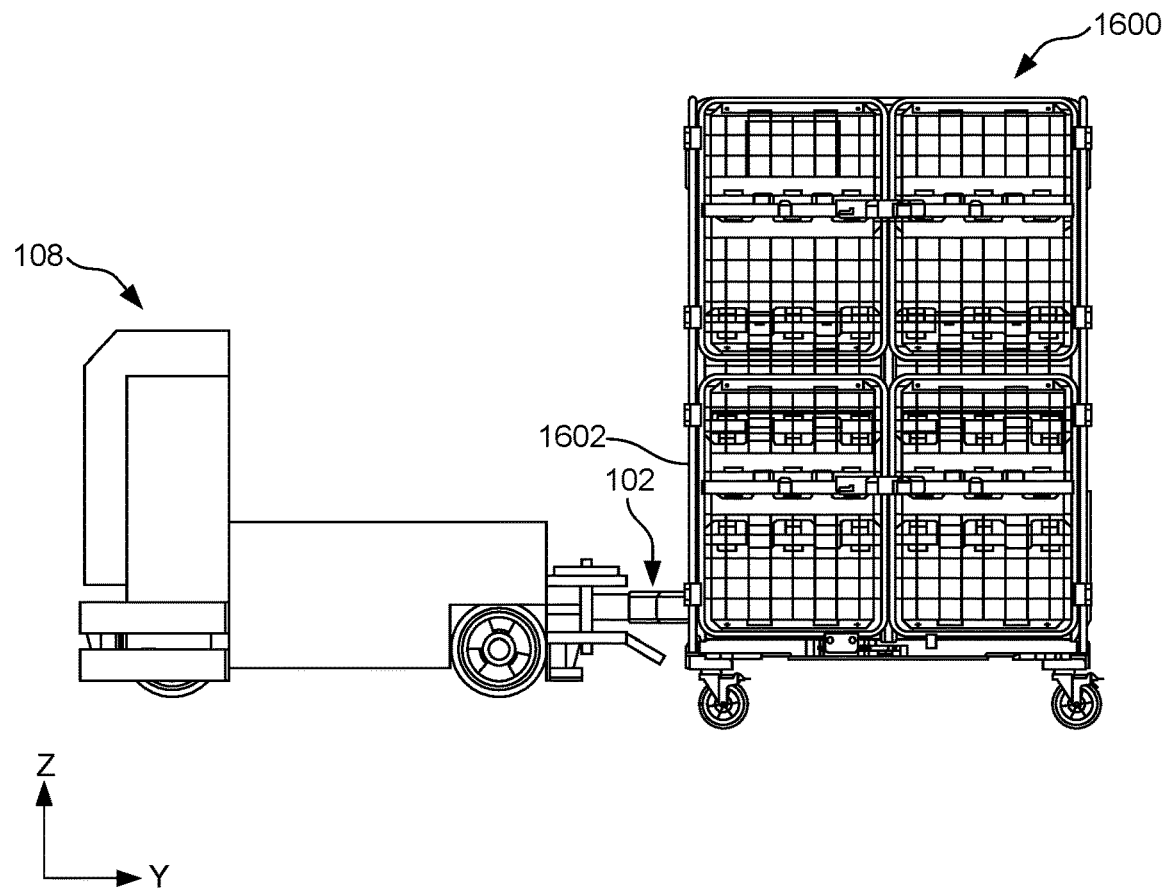
FIG. 16 illustrates a robotic device, such as an autonomous guided vehicle, attached to the second coupler of FIG. 1B for coupling to a second utility cart, according to an example of the present disclosure.

FIG. 16 illustrates the AGV 108 coupling to a utility cart 1600, such as a carriage-style cart, using the second coupler 102. The utility cart 1600, for example, may be configured to carry or otherwise haul goods, items, objects, etc. within containers, bins, cages, etc. As described above, the second coupler 102 may extend from the AGV 108 via the bar 106. In FIG. 16, the second coupler 102 is shown engaging with a frame 1602 or other structural components of the utility cart 1600. For example, the magnetic element 908 of the second coupler 102 may engage with the frame 1602. The position of the bar 106 on the AGV 108 may be varied (e.g., in the Z-direction) to engage with a respective portion of the utility cart 1600. FIG. 16 therefore illustrates that the second coupler 102 may be used to engage with carts, wagons, carriages, and so forth other than the pallet jack 104, as described above.

Figure 17:
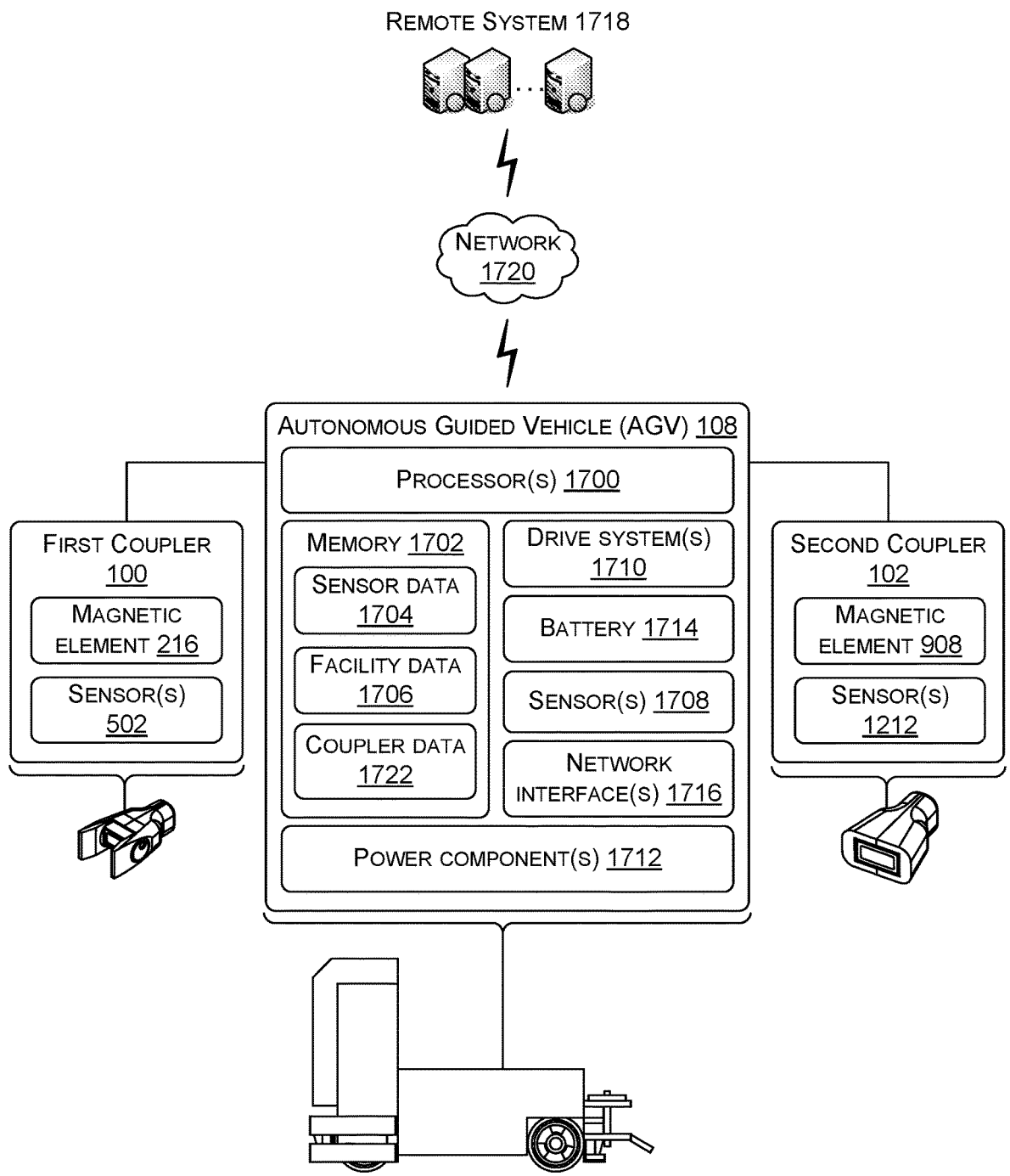
FIG. 17 illustrates select functional components of an autonomous guided vehicle, the first coupler of FIG. 1A, and the second coupler of FIG. 1B, according to an example of the present disclosure.

FIG. 17 illustrates select components of the first coupler 100, the second coupler 102, and the AGV 108. As introduced above, the first coupler 100 includes the magnetic element 216 and the second coupler 102 includes the magnetic element 908. The magnetic element 216 of the first coupler 100 and the magnetic element 908 of the second coupler 102 may represent electromagnets. In some instances, the magnetic element 216 of the first coupler 100 and/or the magnetic element 908 of the second coupler 102 may have between fifty pounds and three hundred pounds of pulling weight. However, the magnetic element 216 of the first coupler 100 and the magnetic element 908 of the second coupler 102 may have pull weights greater than three hundred pounds or less than fifty pounds.

In some instances, the first coupler 100 includes the sensor(s) 502 and the second coupler 102 includes sensor(s) 1212. The sensor(s) 502 and/or the sensor(s) 1212 may include proximity sensor(s), force sensor(s), capacitive sensor(s), or other sensor(s) that generate signals indicative of a proximity of the first coupler 100 and the second coupler 102 to the pallet jack 104 (or other cart), respectively. For example, as noted above, the biasing members 508 and the biasing members 1204 may compress when the magnetic element 216 and/or the magnetic element 908 contacts or abuts a surface, respectively (e.g., the handle 110 or the foot guard 112). In such instances, the sensor(s) 502 and the sensor(s) 1212 may generate a signal indicative of the compression of the biasing members 508 and the biasing members 1204, respectively. As described herein, such signal(s) are used when powering on and powering off the magnetic element 216 and the magnetic element 908, respectively. For example, when the magnetic element 216 of the first coupler 100 and the magnetic element 908 of the second coupler 102 contact a surface of the pallet jack 104, the sensor(s) 502 and the sensor(s) 1212 may respectively measure a force exerted on the magnetic element 216 of the first coupler 100 and the magnetic element 908 of the second coupler 102, a depression of the magnetic element 216 of the first coupler 100 and the magnetic element 908 of the second coupler 102, and so forth. Such sensor(s) are used to understand when the first coupler 100 and the second coupler 102 contact the pallet jack 104.

The sensor(s) 502 of the first coupler 100 and the sensor(s) 1212 of the second coupler 102 may additionally or alternatively include gaussmeters, magnetometers, or other sensor(s) that measure an electromagnetic field (EMF) emitted by the magnetic element 216 of the first coupler 100 and the magnetic element 908 of the second coupler 102, respectively. For example, once the magnetic element 216 of the first coupler 100 and the magnetic element 908 of the second coupler 102 are powered, an EMF is generated. The sensor(s) 502 of the first coupler 100 and the sensor(s) 1212 of the second coupler 102 may detect a disturbance or change in the EMF. For example, the disturbance may be caused by a hand of a user being placed in proximity to the first coupler 100 or the second coupler 102. In response, and as discussed herein, the AGV 108 may cause the magnetic element 216 of the first coupler 100 and the magnetic element 908 of the second coupler 102 to deenergize.

The first coupler 100 and the second coupler 102 are shown being connected to the AGV 108. For example, the first coupler 100 and/or the second coupler 102 may include wired connections with the AGV 108 to receive power for the magnetic element 216 and the magnetic element 908, respectively, transmitting signal(s) generated by the sensor(s) 502 and the sensor(s) 1212, respectively, and so forth. Such communicatively coupling may come by way of the connector 500 and the connector 1100, respectively.

The AGV 108 is shown including processor(s) 1700 that perform various functions or operations associated with transporting carts, trolleys, and the like within an environment, and memory 1702 may storing instructions executable by the processor(s) 1700 to store the operations described herein. Generally, the AGV 108 may represent a robotic device, robotic element, and the like that is configured to autonomously or semi-autonomously operate or navigate about an environment.

The memory 1702 is shown having access to or storing sensor data 1704. The sensor data 1704 may be generated by the sensor(s) 502 of the first coupler 100 and/or the sensor(s) 1212 of the second coupler 102. The AGV 108, for example, may analyze the sensor data 1704 and compare the sensor data 1704 to a threshold (e.g., force, proximity, etc.) for determining whether to power the magnetic element 216 of the first coupler 100 and the magnetic element 908 of the second coupler 102, respectively. For example, if the sensor data 1704 indicates that the magnetic element 216 of the first coupler 100 and the magnetic element 908 of the second coupler 102, respectively, have depressed by a threshold amount, experience a threshold amount of force, and so forth, the AGV 108 may cause power to be supplied to the magnetic element 216 of the first coupler 100 and the magnetic element 908 of the second coupler 102, respectively.

The memory 1702 is further shown storing or having access to facility data 1706 that is associated with an environment in which the AGV 108 traverses. For example, the facility data 1706 may indicate locations of goods, items, carts, and the like within the environment. The AGV 108 may utilize the facility data 1706 when traveling within the environment, such as between locations where carts are picked up and dropped off, outbound stations, inbound stations, inventory, and so forth. In some instances, the AGV 108 travels within designated lanes or isles within the environment. Regardless, the AGV 108 is capable of traveling within the environment and may use the facility data 1706 to determine where to travel within the environment for completing tasks.

To travel or otherwise navigate within the environment, the AGV 108 may include sensor(s) 1708. The sensor(s) 1708 may include, by way of example, imaging sensor(s) that image fiducials on a ground surface of the environment. Imaging the fiducials permits the AGV 108 to travel about the environment from one location to another. Additionally, the sensor(s) 1708 may include camera(s) that detect a location or position of the carts, such as the pallet jack 104, for aligning the first coupler 100 and the second coupler 102 onto the handle 110 or the foot guard 112, for instance. Sensor data generated by the sensor(s) 1708 may be used to steer the AGV 108 for aligning on the pallet jack 104 and engaging the pallet jack 104 for transport.

The sensor(s) 1708 may detect whether the AGV 108 is safe to operate and/or whether it is safe to couple to the cart. For example, camera(s) may capture image(s) or video(s) of an environment around the AGV 108, and computer vision techniques (e.g., object detection) may be used to determine whether persons are within a proximity of the AGV 108 or the coupler. If a person is detected in close proximity, the AGV 108 may refrain from coupling to the cart to prevent injury. As another way to ensure safety, the AGV 108 may supply a low level voltage (e.g., 3 volts) to the magnetic element 216 of the first coupler 100 or the magnetic element 908 of the second coupler 102, for example, and detect whether a corresponding voltage is sensed. In other words, the low level voltage may be used as a way to determine whether the magnetic element 216 of the first coupler 100 or the magnetic element 908 of the second coupler 102 have sufficiently engaged with the cart. For example, contact with the cart may create a circuit and the supplied voltage may be sensed by the sensor(s) 1708. If a hand of a person or other object (e.g., debris, cardboard, etc.) are interposed between the magnetic element 216 of the first coupler 100 and the cart, or the magnetic element 908 of the second coupler 102 and the cart, the corresponding voltage may not be sensed. In such instances, the AGV 108 may refrain from supplying a greater voltage for coupling to the cart until the corresponding voltage is sensed. Additionally, or alternatively, and as noted above, camera(s) or other imaging sensor(s) may be used to determine whether it is safe to engage with the cart.

In some instances, the sensor(s) 1708 may be used to determine whether the AGV 108 is within certain zones of the environment. For example, within the environment, the AGV 108 may travel within lanes from one location to another and while transporting the carts. In such instances, however, if the AGV 108 travels outside of designated locations, such as the lanes, the AGV 108 may be powered off, instructed, or otherwise guided to steer back into the designated locations, and/or decouple from the cart. In this manner, if the AGV 108 performs unexpectedly, the AGV 108 may be controlled to increase safety within the environment and prevent potential injuries, damage, and so forth.

Additionally, or alternatively, as the AGV 108 transports the cart between locations within an environment, a location of the AGV 108 may be continuously determined and referenced to locations that the AGV 108 is permitted to travel. For example, the remote system 108 may determine locations of the AGV 108 (via a location sensor onboard the AGV 108) as a way to track the AGV 108 and/or whether the AGV 108 is located in permitted locations within the environment. If so, the remote system 1718 may continue to monitor the AGV 108. However, if the remote system 1718 determines that the AGV 108 has veered off course, or is located in a restricted area, the remote system 1718 may cause or otherwise instruct the AGV 108 to power off, steer back into the designated locations, and/or decouple from the cart. The remote system 1718 may also determine whether a speed of the AGV 108 is permissible, or whether the AGV 108 is travelling too fast.

In some instances, the memory 1702 also stores coupler data 1722. The coupler data 1722 may be indicative of a respective coupler, such as the first coupler 100 and/or the second coupler 102, coupled to the AGV 108. For example, the coupler data 1722 may indicate a size of the first coupler 100 or the second coupler 102, a location of the magnetic element 216 of the first coupler 100, a location of the magnetic element 908 of the second coupler 102, and so forth. In some instances, the coupler data 1722 is used by the AGV 108 to align the first coupler 100 or the second coupler 102 on the pallet jack 104, or relative to the pallet jack 104, such that the magnetic element 216 of the first coupler 100 or the magnetic element 908 of the second coupler 102 may engage with a respective portion of the pallet jack 104 (e.g., the handle, the foot guard 112, etc.). In some instances, the AGV 108 may include both the first coupler 100 and the second coupler 102 for engaging with a plurality of carts. In such instances, the AGV 108 may select between using the first coupler 100 and/or the second coupler 102 for towing the cart.

The AGV 108 includes drive system(s) 1710 for moving the AGV 108 about the environment. The drive system(s) 1710 may include a motor (electric) or any type of mechanical or electrical engine of sufficient size and power to move the AGV 108. In some instances, the drive system(s) 1710 includes a tread mechanism with a track that is mounted on, and rotated by, a set of wheels. In other instances, drive system(s) 1710 may be embodied in any number of arrangements, including with wheels, digit members (e.g., leg-type members), a drive unit mounted on a track, articulating arm members that move etc. In some instances, the drive system(s) 1710 facilitate one or more degrees of movement to allow rotation about a vertical axis, rotation about a tilt axis, and rotation about a pan axis. One or more motors may be further included to power the movement about the vertical, tilt, and pan axes.

A battery 1714 is further provided to distribute power to the various components of the AGV 108 as well as deliver power to the first coupler 100 and the second coupler 102. Power component(s) 1712, for example, transfer DC to the magnetic element 216 of the first coupler 100 or the magnetic element 908 of the second coupler 102. Additionally, the power component(s) 1712 may charge the battery 1714 of the AGV 108. For example, a power source may supply alternating current (AC) to the AGV 108. In some instances, the amount of AC supplied may be based at least in part on a charge level of battery 1714. As the AGV 108 receives the AC, the power component(s) 1712 convert the AC into DC. The DC may then be transmitted to the battery 1714 for power storage.

The AGV 108 further includes the network interface(s) 1716 to communicate with other devices, such as other AGVs, mobile devices, tablets, and/or a remote system 1718 via a network 1720. For example, the remote system 1718 may instruct the AGV 108 as to locations within the environment in which the AGV 108 is to travel and pick up the pallet jack 104 and drop off the pallet jack 104. The remote system 1718 may also track the AGV 108 within the environment (e.g., location), a charge of the battery 1714, and so forth for at least partially controlling an operation of the AGV 108. The network interface(s) 1716 enables access to one or more types of networks, including wired and wireless networks. When implemented as a wireless unit, the network interface(s) 1716 use an antenna to send and receive wireless signals. In some instances, the AGV 108 may communicatively couple to remote system using one or more communication channel(s), or network(s), such as Bluetooth (e.g., 802.11), Bluetooth Low Energy (BLE), ZigBee (e.g., 802.15.4), Z-wave, Wi-Fi), or the like.

The remote system 1718 may have access to information associated with the environment (e.g., size, floors, location goods, items, carts, etc.), information associated with the carts, and so forth to permit the remote system 1718 to instruct and/or coordinate the transportation of carts within the environment.

The network 1720 may represent any type of communication network, including a data network, and may be implemented using wired infrastructure (e.g., cable, CAT5, fiber optic cable, etc.), a wireless infrastructure (e.g., RF, cellular, microwave, satellite, Bluetooth, etc.), and/or other connection protocols.

In some instances, the remote system 1718 may be located within the environment and/or remote from the environment. The remote system 1718 may further be implemented as one or more servers and may, in some instances, form a portion of a network-accessible computing platform implemented as a computing infrastructure of processors, storage, software, data access, etc. that is maintained and accessible via a network such as the Internet. Common expressions associated with the remote system 1718 include "on-demand computing", "software as a service (SaaS)", "platform computing", "network-accessible platform", "cloud services", "data centers", etc.

As used herein, a processor, such as the processor(s) 1700 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory 1702 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 18:
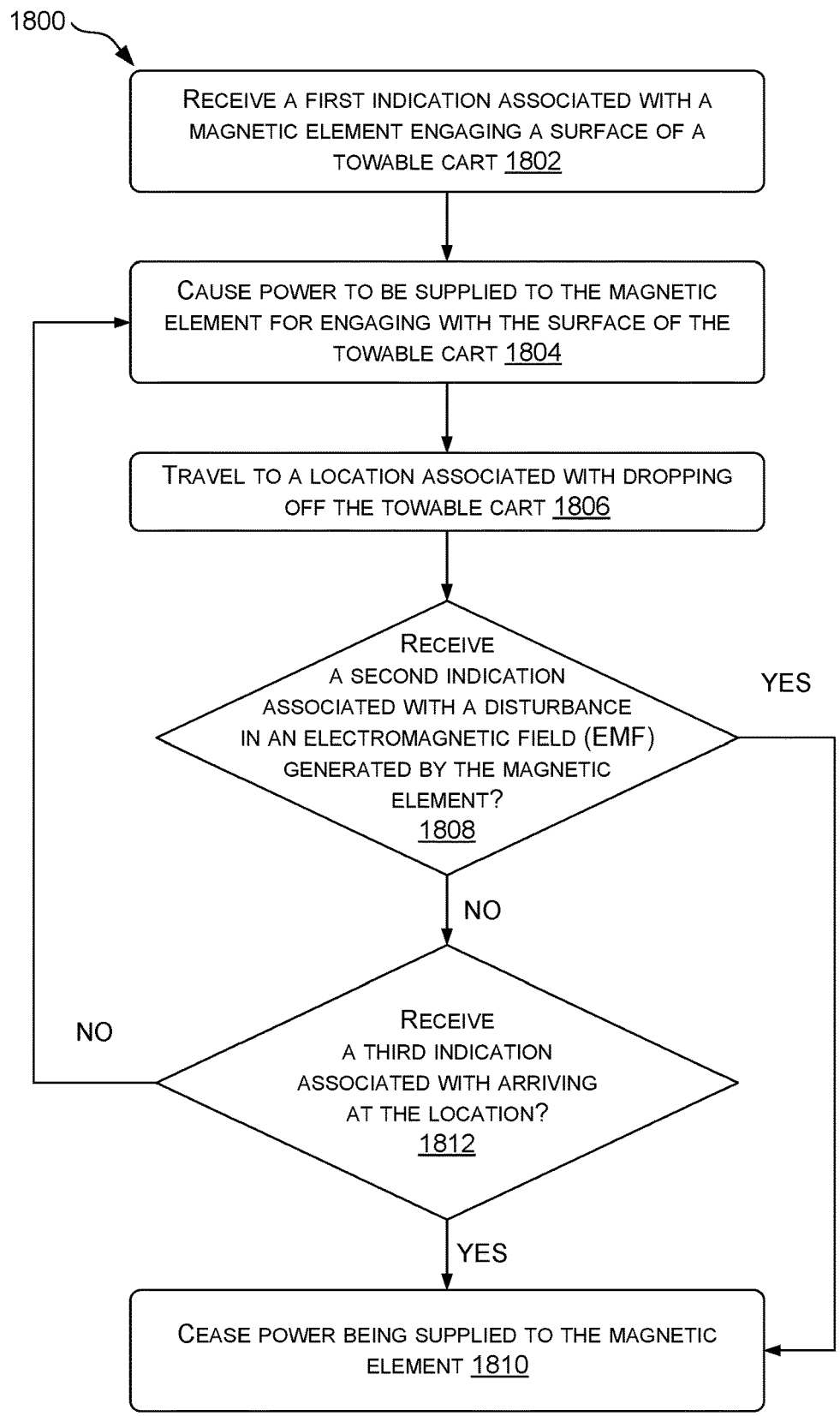
FIG. 18 illustrates an example process for coupling an autonomous guided vehicle to a pallet jack, or other towable cart, according to an example of the present disclosure.

FIG. 18 illustrates a process 1800 for towing a cart, such as a pallet jack 104, using the first coupler 100 or the second coupler 102. The process 1800 described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process 1800, or alternative processes, and not all of the blocks need be executed. For discussion purposes, the process 1800 is described with reference to the environments, architectures and systems described in the examples herein, such as, for example those described with respect to FIGS. 1-17, although the process 1800 may be implemented in a wide variety of other environments, architectures, and systems.

At 1802, the process 1800 may include receiving a first indication associated with a magnetic element engaging a surface of a towable cart. For example, based at least in part on the magnetic element of the towable cart, such as a pallet jack, engaging with the towable cart, the AGV 108 may receive an indication of such. In some instances, the first indication may be indicative of an amount of force pressing against the magnetic element, an amount of translation experienced by the magnetic element (e.g., retraction within the receptacle), an amount of compression of biasing members engaged with the magnetic element (or a cabinet thereof), and so forth.

At 1804, the process 1800 may include causing power to be supplied to the magnetic element for engaging the surface of the towable cart. For example, the AGV 108 may cause power to be supplied to the magnetic element such that the magnetic element may create an EMF and magnetically couple to the surface of the towable cart. The surface of the towable cart may be a handle, frame, and so forth. As such, based on contacting the towable cart, for example, the magnetic element (e.g., an electromagnet) maybe induced.

At 1806, after magnetically coupling to the towable cart, the process 1800 may include traveling to a location associated with dropping off the towable cart. From example, the AGV 108 may travel from an inbound location (at which the AGV 108 picks up the towable cart) to an outbound station (at which the AGV 108 drops off the towable cart). Between such locations, the AGV 108 maintains a coupling with the towable cart via the magnetic element.

At 1808, the process 1800 may include determining whether a second indication is received associated with a disturbance in an EMF generated by the magnetic element. For example, as the magnetic element is powered and magnetically coupled to the towable cart, the magnetic element creates the EMF. Sensor(s) may monitor a strength of the EMF and/or whether disturbances are detected. Such disturbances, for example, may come by way of other conductive elements coming within range of the EMF or a sensed region of the sensor(s). For example, a hand or foot of a user may come within the sensed region and the sensor(s) may detect a change (or disturbance) in the EMF. The sensor(s) may be located onboard the coupler and sensor data generated by the sensor may be transmitted to the AGV 108. In turn, the AGV 108 may process the sensor data and determine whether the change is greater than a threshold amount.

If at 1808 the process 1800 receives the second indication indicative of the disturbance in the EMF, the process 1800 may follow the "YES" route and proceed to 1810. At 1810, the process 1800 may include ceasing power to the magnetic element. For example, the AGV 108 may terminate power to the coupler and as a result, the coupler may decouple for the towable cart. Such decoupling, for example, may reduce injury to workers within the environment. That is, if a hand of a user is placed proximate the coupler, such that the hand creates a change in the EMF, the power to the coupler may be ceased to prevent injury to the worker. Additionally such change may be based on the magnetic element becoming decoupled from the towable cart.

Alternatively, if at 1808 the process 1800 does not receive the second indication, the process 1800 may follow the "NO" route and proceed to 1812. At 1812, the process 1800 may include determining whether a third indication is received associated with arriving at the location. For example, upon arriving at the destination location for dropping off the towable cart, the AGV 108 may receive an indication of such. Alternatively, a location sensor (e.g., GPS) maybe used to determine that the AGV 108 has arrived at the drop off location. If the AGV 108 determines the third indication has not been received, the process 1800 may loop to 1804 to continue causing power to be supplied for maintaining an engagement between the magnetic element and the surface of the towable cart. Alternatively, if the AGV 108 has arrived at the location, the AGV 108 may decouple from the surface of the towable cart and follow the "YES" route to 1810.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A coupler comprising:
    a housing including:
        a first end having a socket, the socket being configured to couple to a bar extending from an autonomous guided vehicle (AGV), the bar coupling the coupler to the AGV, and
        a second end having a receptacle;
    one or more biasing members;
    one or more sensors;
    a connector disposed within the socket, the connector communicatively coupling the one or more sensors to a computing device of the AGV;
    a magnetic element operably coupled to the housing and at least partially disposed within the receptacle, the magnetic element being configured to magnetically engage a portion of a pallet jack for transport by the AGV, and based on a compression of the one or more biasing members;
    at least one wire configured to couple to the AGV for providing power to the magnetic element; and
    a cabinet at least partially disposed over the magnetic element.

2. The coupler of claim 1, wherein:
    the second end of the housing includes a first arm and a second arm, the first arm and the second arm having:
        a first portion that is substantially parallel to a longitudinal axis of the housing, and
        a second portion that tapers outward in a direction away from the longitudinal axis of the housing; and
    the receptacle is defined at least in part by the first arm and the second arm.

3. The coupler of claim 2, wherein the magnetic element is rotationally coupled to the housing, between the first arm and the second arm.

4. The coupler of claim 1, wherein:
    the receptacle includes sidewalls and a bottom;
    the magnetic element is disposed at least partially within the sidewalls; and
    the one or more biasing members are disposed between the bottom and the magnetic element, the one or more biasing members biasing the magnetic element towards the second end.

5. The coupler of claim 1, wherein the portion of the pallet jack comprises one of a handle of the pallet jack or a foot guard of the pallet jack.

6. A coupler comprising:
    a housing including:
        a first end configured to couple to an autonomous guided vehicle (AGV), and
        a second end having a receptacle;
    a cabinet operably coupled to the housing and at least partially disposed within the receptacle; and
    a magnetic element disposed at least partially within the cabinet, the magnetic element being configured to magnetically engage with a portion of a towable cart for transport by the AGV.

7. The coupler of claim 6, wherein:
    the housing includes a first arm and a second arm disposed at the second end;
    the first arm and the second arm at least partially define the receptacle; and
    the at least the portion of the towable cart resides within the receptacle, between the first arm and the second arm.

8. The coupler of claim 6, wherein:
    the housing further includes:
        a first passage extending from a first side of the housing to the receptacle, and
        a second passage extending from a second side of the housing to the receptacle; and
    the coupler further comprises:
        a first disc at least partially residing within the first passage and rotatable within the first passage, the first disc coupling to a first side of the cabinet, and
        a second disc at least partially residing within the second passage and rotatable within the second passage, the second disc coupling to a second side of the cabinet.

9. The coupler of claim 6, further comprising one or more biasing members extending from a bottom of the receptacle, wherein the one or more biasing members:
- engage with at least one of the cabinet or the magnetic element; and
- bias the magnetic element in a direction towards an end of the receptacle.

10. The coupler of claim 9, wherein:
the magnetic element transitions between a first position and a second position;
in the first position, the magnetic element extends at least partially out of the end of the receptacle; and
in the second position, the magnetic element is substantially retracted within the receptacle.

11. The coupler of claim 6, wherein:
the first end includes a socket for coupling to the AGV; and
the socket includes one or more connectors for communicatively coupling with a computing device of the AGV.

12. The coupler of claim 6, wherein the coupler is configured to rotate with the AGV and during transport of the towable cart.

13. The coupler of claim 6, further comprising one or more sensors configured to generate a signal associated with the magnetic element contacting the portion of the towable cart.

14. The coupler of claim 6, further comprising a channel extending at least partially through the housing, the channel being configured to receive a wire that supplies power to the magnetic element.

15. A coupler comprising:
a housing configured to couple to a robotic device that moves about an environment;
a magnetic element disposed at least partially within the housing, the magnetic element being configured to magnetically engage with a portion of a cart for transport by the robotic device; and
one or more sensors configured to generate a signal associated with the coupler contacting the portion of the cart, wherein the robotic device is configured to provide power to the magnetic element based at least in part on receiving the signal to magnetically engage the magnetic element with the portion of the cart.

16. The coupler of claim 15, wherein:
the housing includes a first arm and a second arm;
the first arm and the second arm at least partially define a receptacle that receives the portion of the cart; and
the first arm and the second arm have:
- a first portion that is substantially parallel to a longitudinal axis of the housing, and
- a second portion that tapers outward in a direction away from the longitudinal axis of the housing.

17. The coupler of claim 15, wherein the housing includes a first passage extending through a first side of the housing and a second passage extending through a second side of the housing, further comprising:
a first disc at least partially residing within the first passage and coupled to the magnetic element, the first disc being rotatable within the first passage; and
a second disc at least partially residing within the second passage and coupled to the magnetic element, the second disc being rotatable within the second passage.

18. The coupler of claim 15, wherein:
the housing includes a receptacle;
the magnetic element at least partially resides within the receptacle; and
one or more biasing members extend from a bottom of the receptacle and engage the magnetic element, the one or more biasing members urging the magnetic element at least partially out of the receptacle.

19. The coupler of claim 15, wherein:
the housing includes a socket for coupling to the robotic device; and
the socket includes one or more connectors for communicatively coupling with a computing device of the robotic device.

20. The coupler of claim 15, further comprising a channel extending at least partially through the housing, the channel being configured to receive a wire that supplies the power to the magnetic element.

* * * * *